United States Patent [19]

Yamamoto

[11] Patent Number: 5,432,853
[45] Date of Patent: Jul. 11, 1995

[54] DIGITAL SIGNAL PROCESSING SYSTEM

[75] Inventor: Seiji Yamamoto, Itami, Japan

[73] Assignee: Mitsubishi Denki Kabushiki Kaisha, Tokyo, Japan

[21] Appl. No.: 212,857

[22] Filed: Mar. 15, 1994

[30] Foreign Application Priority Data

Apr. 2, 1993 [JP] Japan .................. 5-076833

[51] Int. Cl.⁶ .............................. H04L 9/00
[52] U.S. Cl. ................. 380/46; 364/224.21; 364/717; 331/38
[58] Field of Search ............ 380/46; 364/224.21, 364/717; 331/38

[56] References Cited

U.S. PATENT DOCUMENTS 3,700,806 10/1972 Vasseur ................ 380/46
4,304,962 12/1981 Fracassi et al. ........... 380/46

*Primary Examiner*—David C. Cain
*Attorney, Agent, or Firm*—Oblon, Spivak, McClelland, Maier & Neustadt

[57] ABSTRACT

A selector circuit (11) generates generator polynomial information (SD) by performing a predetermined logic operation in response to a random number signal (S1). A quasi-random code generator circuit (1) outputs a quasi-random code (RP) by using a generator polynomial determined based on the generator polynomial information (SD). An exclusive-OR gate (6) scrambles an input digital signal (DI) by calculating the exclusive-OR of the input digital signal (DI) applied to its first input and the quasi-random code (RP) applied to its second input, to output a scrambled output digital signal (DO). The generator polynomial may be changed for each packet, whereby a digital signal processing system is permitted to transmit and receive the scrambled digital signal which is difficult to decode.

22 Claims, 26 Drawing Sheets

DIGITAL SIGNAL PROCESSING SYSTEM

BACKGROUND OF THE INVENTION

1. Field of the Invention

The present invention relates to a digital signal processing system for digital signal transmission with scrambling/de-scrambling function.

2. Description of the Background Art

FIG. 25 is a circuit diagram of a conventional scrambling circuit for scrambling/de-scrambling digital signals in a digital signal processing system.

The scrambling circuit incudes a quasi-random code generator circuit 4 and an exclusive-OR gate 6, as shown in FIG. 25. The quasi-random code generator circuit 4 includes n D flip-flops FF1 to FFn (n≧2) and (n−1) exclusive-OR gates EX1 to EX(n−1).

The D-input of the D flip-flop FF1 is connected to the Q-output of the D flip-flop FFn. The Q-output of the D flip-flop FFi (i=1 to (n−1)) is applied to a first input of the exclusive-OR gate EXi, and the output of the exclusive-OR gate EXi is applied to the D-input of the D flip-flop FF(i+1). The Q-output of the D flip-flop FFn is applied to a second input of the exclusive-OR gate EXi in common. A clock signal CLK is applied to the respective T-input of the D flip-flops FF1 to FFn through a clock input terminal 20 in common.

The quasi-random code generator circuit 4 in which the plurality of D flip-flops FF are connected in series, with the exclusive-OR gates EX provided respectively between the adjacent D flip-flops FF, outputs a quasi-random code RP based on a predetermined generator polynomial from the Q-output of the D flip-flop FFn. The generator polynomial is determined uniquely by the number of connected D flip-flops FF, the number of exclusive-OR gates EX and the positions of the exclusive-OR gates EX.

The exclusive-OR gate 6 has a first input receiving an input digital signal DI through a data input terminal 30 and a second input receiving the Q-output of the D flip-flop FFn. The exclusive-OR gate 6 outputs an output digital signal DO through a data output terminal 40.

FIG. 26 illustrates an exemplary data frame of packet data to be transmitted and received. The packet data contains start/end flags F, (real) data, and an abort pattern, as shown in FIG. 26.

The scrambling of the scrambling circuit of FIG. 25 will be described below. The D flip-flops FF1 to FFn are made to shift and to hold predetermined data as initial values for initialization. One of the D flip-flops FF1 to FFn is designed to hold "1".

For transmission of the packet including the data frame shown in FIG. 26, the inputted data pattern ((real) data, start/end flags, abort pattern) is accepted in the form of the input digital signal DI from the data input terminal 30. On detection of the start flag by a start flag detector not shown, scrambling is performed on the information following the start flag in the input digital signal DI.

The scrambling will be discussed below. The input digital signal DI is given from the data input terminal 30. The exclusive-OR gate 6 calculates the exclusive-OR of the input digital signal DI and the Q-output of the D flip-flop FFn which is the quasi-random code for each bit to scramble the input digital signal DI. The exclusive-OR gate 6 then outputs the output digital signal DO.

For receiving the scrambled packet data, the inputted data pattern is accepted in the form of the input digital signal DI from the data input terminal 30. On detection of the start flag by the start flag detector not shown, de-scrambling is performed on the information following the start flag in the input digital signal DI.

The de-scrambling will be discussed below. The input digital signal DI is given from the data input terminal 30. The exclusive-OR gate 6 calculates the exclusive-OR of the input digital signal DI and the Q-output of the D flip-flop FFn which is the quasi-random code RP for each bit to de-scramble the input digital signal DI. The exclusive-OR gate 6 then outputs the output digital signal DO.

The scrambling (de-scrambling) is terminated by resetting the quasi-random code generator circuit 4 on detection of the abort pattern in the packet data frame by an abort pattern detector not shown. The scrambling circuit of FIG. 26 is designed to scramble/de-scramble the information between the data following the start flag and the abort pattern in the packet data.

The scrambling circuit (de-scrambling circuit) of the conventional digital signal processing system as above constructed presents the problem that a fixed generator polynomial of the quasi-random code generator circuit allows the scrambled digital signal to be readily decoded.

SUMMARY OF THE INVENTION

The present invention is directed to a digital signal processing system including a digital signal transmitter having scrambling means for scrambling a digital signal by the scrambling means to transmit a scrambled digital signal, and a digital signal receiver having de-scrambling means and receiving the scrambled digital signal for de-scrambling the scrambled digital signal by the de-scrambling means to provide a de-scrambled digital signal. According to the present invention, the scrambling means comprises: generator polynomial information generating means for generating generator polynomial information; first quasi-random code generating means receiving the generator polynomial information for outputting a quasi-random code in accordance with a generator polynomial determined based on the generator polynomial information; and scrambling arithmetic means for generating the scrambled digital signal for each packet containing scrambled digital information provided by performing scrambling arithmetic on a part of a digital signal to be transmitted and the quasi-random code and generator polynomial associated information associated with the generator polynomial information which is not scrambled, and the de-scrambling means comprises: generator polynomial information extracting means for extracting the generator polynomial associated information in the scrambled digital signal to output the generator polynomial information on the basis of the generator polynomial associated information; second quasi-random code generating means receiving the generator polynomial information for outputting a quasi-random code in accordance with a generator polynomial determined based on the generator polynomial information; and de-scrambling arithmetic means for performing de-scrambling arithmetic on the scrambled digital information in the scrambled digital signal and the quasi-random code to generate the de-scrambled digital signal.

In the digital signal processing system of the present invention, the digital signal transmitter obtains by the scrambling arithmetic means the scrambled digital signal for each packet containing the scrambled digital information provided by performing the scrambling arithmetic on the part of the digital signal to be transmitted and the quasi-random code on the basis of the generator polynomial information, and the generator polynomial associated information associated with the generator polynomial information which is not scrambled. Then the digital signal transmitter transmits the scrambled digital signal.

The digital signal receiver obtains the generator polynomial information from the generator polynomial associated information in the scrambled digital signal by the generator polynomial information extracting means, and de-scrambles the scrambled digital information in the scrambled digital signal on the basis of the generator polynomial information by the de-scrambling arithmetic means.

This enables the generator polynomial information to change for each packet for scrambling/de-scrambling, which is effective to transmit and receive the scrambled digital signal that is difficult to decode.

According to another aspect of the present invention, the scrambling means comprises: first quasi-random code generating means for outputting a plurality of quasi-random codes in accordance with a predetermined generator polynomial; quasi-random code selection signal generating means for generating a quasi-random code selection signal indicative of a quasi-random code to be selected from the plurality of quasi-random codes; first quasi-random code selecting means receiving the quasi-random code selection signal for outputting the quasi-random code indicated by the quasi-random code selection signal as a selected quasi-random code; and scrambling arithmetic means for generating the scrambled digital signal for each packet containing scrambled digital information provided by performing scrambling arithmetic on a part of a digital signal to be transmitted and the selected quasi-random code and quasi-random code selection signal associated information associated with the quasi-random code selection signal which is not scrambled, and the de-scrambling means comprises: second quasi-random code generating means for outputting a plurality of quasi-random codes in accordance with the predetermined generator polynomial; quasi-random code selection signal extracting means for extracting the quasi-random code selection signal associated information in the scrambled digital signal to output the quasi-random code selection signal on the basis of the quasi-ransom code selection signal associated information; second quasi-random code-selecting means receiving the quasi-random code selection signal for outputting one of the plurality of quasi-random codes which is indicated by the quasi-random code selection signal as the selected quasi-random code; and de-scrambling arithmetic means for performing de-scrambling arithmetic on the scrambled digital information in the scrambled digital signal and the selected quasi-random code to generate the de-scrambled digital signal.

In the digital signal processing system of the second aspect of the present invention, the digital signal transmitter obtains by the scrambling arithmetic means the scrambled digital signal for each packet containing the scrambled digital information provided by performing scrambling arithmetic on the part of the digital signal to be transmitted and the selected quasi-random code on the basis of the generator polynomial information, and the quasi-random code selection signal associated information associated with the quasi-random code selection signal which is not scrambled. Then the digital signal transmitter transmits the scrambled digital signal.

The digital signal receiver obtains the quasi-random code selection signal from the quasi-random code selection signal associated information in the scrambled digital signal by the quasi-random code selection signal extracting means, and de-scrambles the scrambled digital information in the scrambled digital signal on the basis of the quasi-random code selection signal by the de-scrambling arithmetic means.

This enables the change of the quasi-random code selection signal indicative of one of the plurality of quasi-random codes for each packet for scrambling/de-scrambling, which is effective to transmit and receive the scrambled digital signal that is difficult to decode.

According to still another aspect of the present invention, the scrambling means comprises: generator polynomial information generating means for generating generator polynomial information; first quasi-random code generating means receiving the generator polynomial information for outputting a plurality of quasi-random codes in accordance with a generator polynomial determined based on the generator polynomial information; quasi-random code selection signal generating means for generating a quasi-random code selection signal indicative of a quasi-random code to be selected from the plurality of quasi-random codes; first quasi-random code selecting means receiving the quasi-random code selection signal for outputting the quasi-random code indicated by the quasi-random code selection signal as a selected quasi-random code; and scrambling arithmetic means for generating the scrambled digital signal for each packet containing scrambled digital information provided by performing scrambling arithmetic on a part of a digital signal to be transmitted and the selected quasi-random code, generator polynomial associated information associated with the generator polynomial information which is not scrambled, and quasi-random code selection signal associated information associated with the quasi-random code selection signal which is not scrambled, and the de-scrambling means comprises: generator polynomial information extracting means for outputting the generator polynomial information on the basis of the generator polynomial associated information in the scrambled digital signal; second quasi-random code generating means receiving the generator polynomial information for outputting a plurality of quasi-random codes in accordance with a generator polynomial determined based on the generator polynomial information; quasi-random code selection signal extracting means for outputting the quasi-random code selection signal on the basis of the quasi-random code selection signal associated information in the scrambled digital signal; second quasi-random code selecting means receiving the quasi-random code selection signal for outputting one of the plurality of quasi-random codes which is indicated by the quasi-random code selection signal as the selected quasi-random code; and de-scrambling arithmetic means for performing de-scrambling arithmetic on the scrambled digital information in the scrambled digital signal and the selected quasi-random code to generate the de-scrambled digital signal.

In the digital signal processing system of the third aspect of the present invention, the digital signal transmitter obtains by the scrambling arithmetic means the scrambled digital signal for each packet containing the scrambled digital information provided by performing the scrambling arithmetic on the part of the digital signal to be transmitted and the selected quasi-random code on the basis of the generator polynomial information, the generator polynomial associated information associated with the generator polynomial information which is not scrambled, and the quasi-random code selection signal associated information associated with the quasi-random code selection signal which is not scrambled. Then the digital signal transmitter transmits the scrambled digital signal.

The digital signal receiver obtains the generator polynomial information from the generator polynomial associated information in the scrambled digital signal by the generator polynomial information extracting means, and obtains the quasi-random code selection signal from the quasi-random code selection signal associated information in the scrambled digital signal by the quasi-random code selection signal extracting means. Then the digital signal receiver de-scrambles the scrambled digital information in the scrambled digital signal on the basis of the generator polynomial information and quasi-random code selection signal by the de-scrambling arithmetic means.

This enables the changes of the generator polynomial information and the quasi-random code selection signal indicative of one of the plurality of quasi-random codes which is to be selected for each packet for scrambling/de-scrambling, which is effective to transmit and receive the scrambled digital signal that is difficult to decode.

An object of the present invention is to provide a digital signal processing system which is capable of transmitting and receiving a digital signal scrambled so as not to be easily decoded.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>

Figure 1:
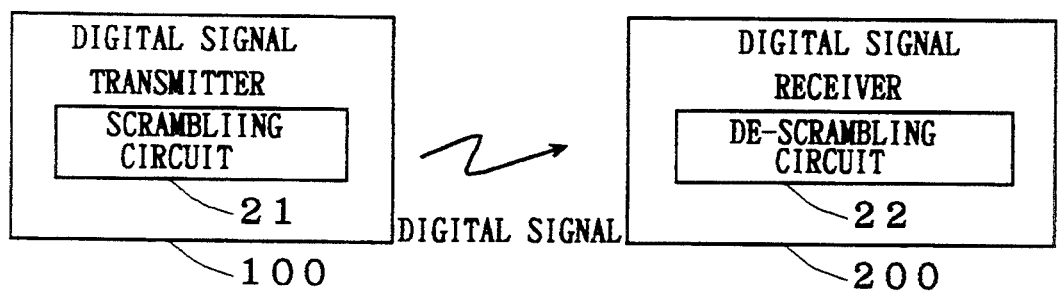
FIG. 1 schematically illustrates a digital signal processing system according to the present invention.

FIG. 1 schematically illustrates a digital signal processing system according to a first preferred embodiment of the present invention. A digital signal transmitter 100 transmits a digital signal scrambled by a scrambling circuit 21 provided therein, as shown in FIG. 1. A digital signal receiver 200 receives the scrambled digital signal and de-scrambles the signal by a de-scrambling circuit 22 provided therein to provide a de-scrambled digital signal which is out of the scrambled state. Data communication means between the digital signal transmitter 100 and the digital signal receiver 200 may be wireless or wired.

Figure 2:
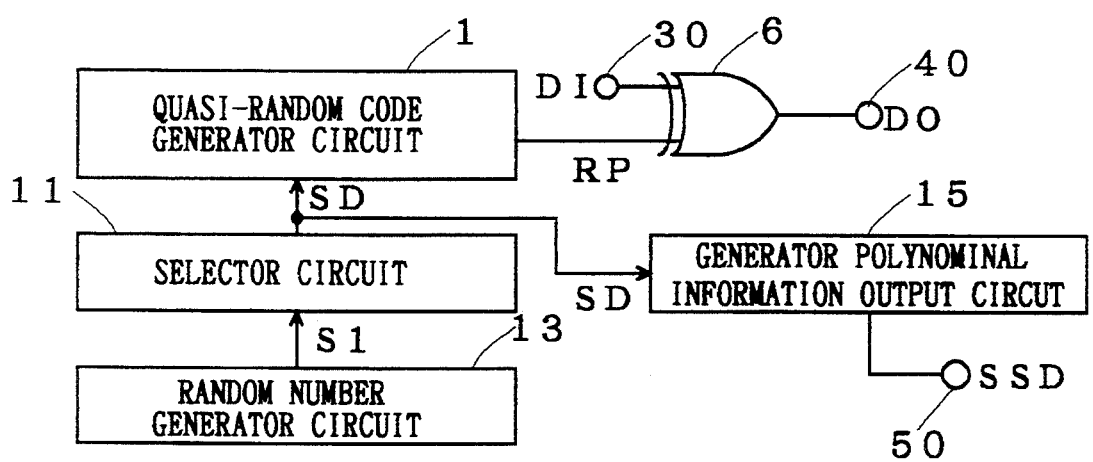
FIG. 2 is a block diagram of a scrambling circuit according to a first preferred embodiment of the present invention.

FIG. 2 is a block diagram of the scrambling circuit 21 in the digital signal transmitter 100 of FIG. 1. As shown in FIG. 2, a random number generator circuit 13 generates a random number signal S1 to output it to a selector circuit 11. The selector circuit 11 performs a predetermined logical operation in response to the random number signal S1 to generate and output generator polynomial information SD to a quasi-random code generator circuit 1. A generator polynomial information output circuit 15 parallel-to-serial converts the generator polynomial information SD into a serial generator polynomial signal SSD, which is outputted from a generator polynomial information output terminal 50. Thus a transmitter can recognize the generator polynomial information SD from the serial generator polynomial signal SSD given through the generator polynomial information output terminal 50.

The quasi-random code generator circuit 1 receives the generator polynomial information SD from the selector circuit 11 and outputs a quasi-random code RP by using a generator polynomial determined based on the generator polynomial information SD.

An exclusive-OR gate 6 has a first input receiving an input digital signal DI through a data input terminal 30 and a second input receiving the quasi-random code RP from the quasi-random code generator circuit 1, and scrambles the input digital signal DI by calculating the exclusive-OR of the input digital signal DI and the quasi-random code RP to output a scrambled output digital signal DO through a data output terminal 40. The output digital signal DO is transmitted from the digital signal transmitter 100.

Figure 3:
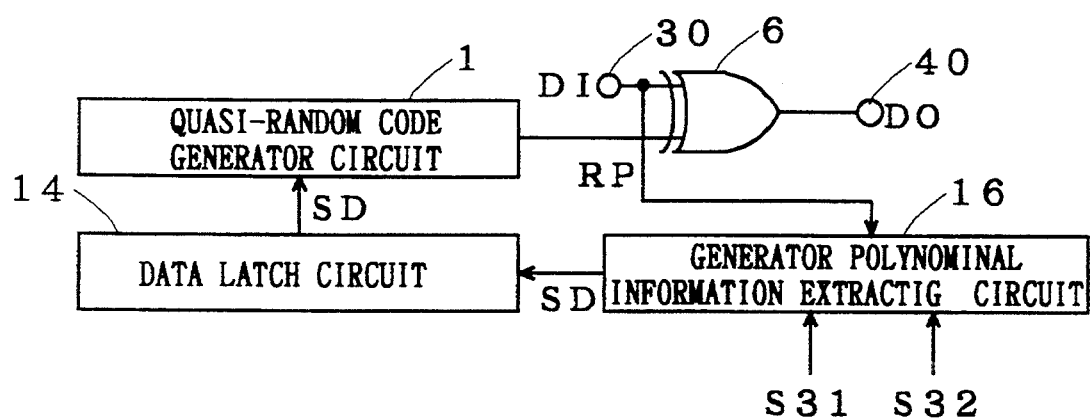
FIG. 3 is a block diagram of a de-scrambling circuit according to the first preferred embodiment.

FIG. 3 is a block diagram of the de-scrambling circuit 22 in the digital signal receiver 200 of FIG. 1. A generator polynomial information extracting circuit 16 extracts the serial generator polynomial signal SSD from the input digital signal DI given through the data input terminal 30 and serial-to-parallel converts the serial generator polynomial signal SSD to output the generator polynomial information SD to a data latch circuit 14. The generator polynomial information extracting circuit 16 can recognize the serial generator polynomial signal SSD in the input digital signal DI on the basis of a start flag detection signal S31 (to be described later in detail) indicative of the start of packet data and an SSD detection signal S32 (to be described later in detail) indicative of the detection of the serial generator polynomial signal SSD to extract the serial generator polynomial signal SSD.

The data latch circuit 14 latches the generator polynomial information SD and outputs the generator polynomial information SD to the quasi-random code generator circuit 1 in the same manner that the selector circuit 11 outputs the generator polynomial information SD.

The quasi-random code generator circuit 1 receives the generator polynomial information SD from the data latch circuit 14 and outputs the quasi-random code RP by using the generator polynomial determined based on the generator polynomial information SD.

The exclusive-OR gate 6 has a first input receiving the input digital signal DI through the data input terminal 30 and a second input receiving the quasi-random code RP from the quasi-random code generator circuit 1, and de-scrambles the scrambled input digital signal DI by calculating the exclusive-OR of the input digital signal DI and the quasi-random code RP to output a de-scrambled output digital signal DO through the data output terminal 40.

The digital signal receiver 200 is enabled to obtain real data from the de-scrambled output digital signal DO.

Figure 4:
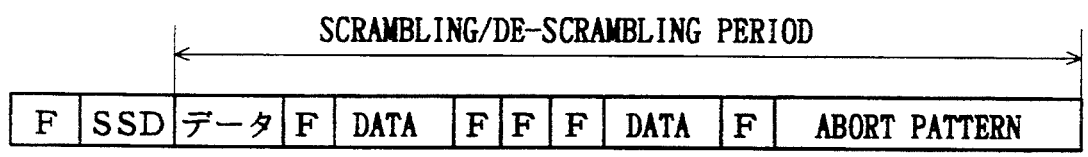
FIG. 4 illustrates packet data for use in the first preferred embodiment.

FIG. 4 illustrates packet data. In FIG. 4, F indicates a start flag or an end flag located at the beginning of the packet data or between a plurality of (real) data of the packet data. An abort pattern indicates the end of the packet data. In this way, the packet data contains the start flag in the first position, the serial generator polynomial signal SSD in the second position, the plurality of data and start (end) flags, and the abort pattern in the last position.

Figure 5:
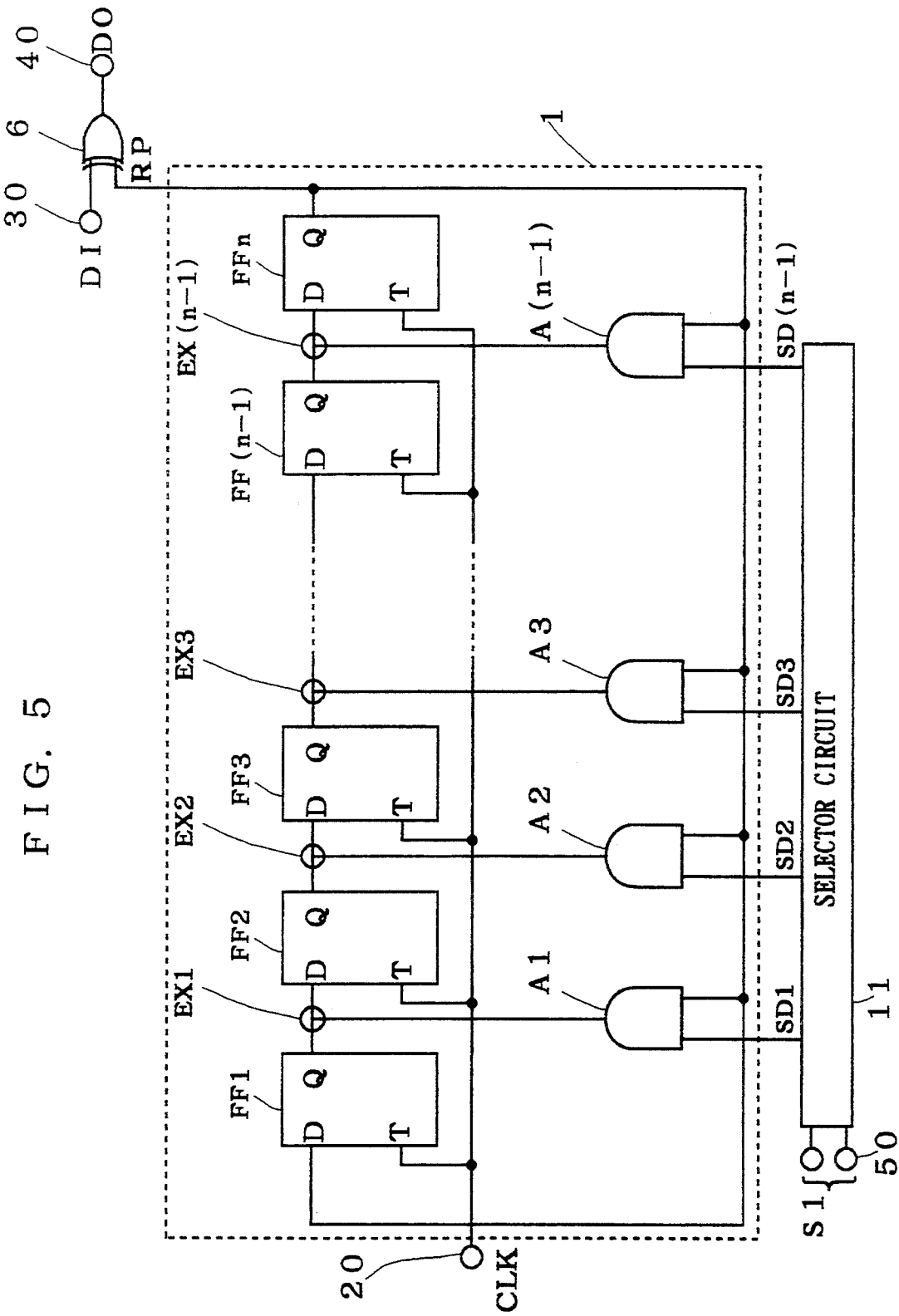
FIG. 5 is a circuit diagram showing the internal arrangement of a quasi-random code generator circuit of the first preferred embodiment.

FIG. 5 is a circuit diagram showing the details of the quasi-random code generator circuit 1 of FIGS. 3 and 4. The quasi-random code generator circuit 1 includes n D flip-flops FF1 to FFn ($n \geq 2$), (n−1) exclusive-OR gates EX1 to EX(n−1), and (n−1) AND gates A1 to A(n−1), as shown in FIG. 5.

The D-input of the D flip-flop FF1 is connected to the Q-output of the D flip-flop FFn. The Q-output of the D flip-flop FFn is connected to respective first input of the AND gates A1 to A(n−1) in common. The AND gates A1 to A(n−1) receive, at their second input, bit information SD1 to SD(n−1) of the generator polynomial information SD outputted from the selector circuit 11, respectively.

The Q-output of the D flip-flop FFi (i=1 to (n−1)) is applied to a first input of the exclusive-OR gate EXi, and the output of the AND gate Ai is applied to a second input of the exclusive-OR gate EXi. The output of the exclusive-OR gate EXi is applied to the D-input of the D flip-flop FF(i+1).

A clock signal CLK is applied to the respective T-input of the D flip-flops FF1 to FFn in common through a clock input terminal 20.

The quasi-random code generator circuit 1 makes invalid some or all of the Q-output signals of the D flip-flop FFn which are fed back to the respective second input of the exclusive-OR gates EX1 to EX(n−1) by forcibly setting the output of the AND gates A1 to A(n−1) to "L" on the basis of the generator polynomial information SD. When the bit information SDi of the selector circuit 11 is "L", the output of the AND gate Ai is "L" whether the Q-output of the D flip-flop FFn is "H" or "L". This is equivalent to the absence of the exclusive-OR gate EXi between the D flip-flops FFi and FF(i+1).

The generator polynomial is determined uniquely by the number of connected D flip-flops FF, the number of exclusive-OR gates EX and the positions of the exclusive-OR gates EX. Thus, the quasi-random code generator circuit 1 may change the generator polynomial by changing the number and positions of the exclusive-OR gates EX on the basis of the generator polynomial information SD.

Figure 6:
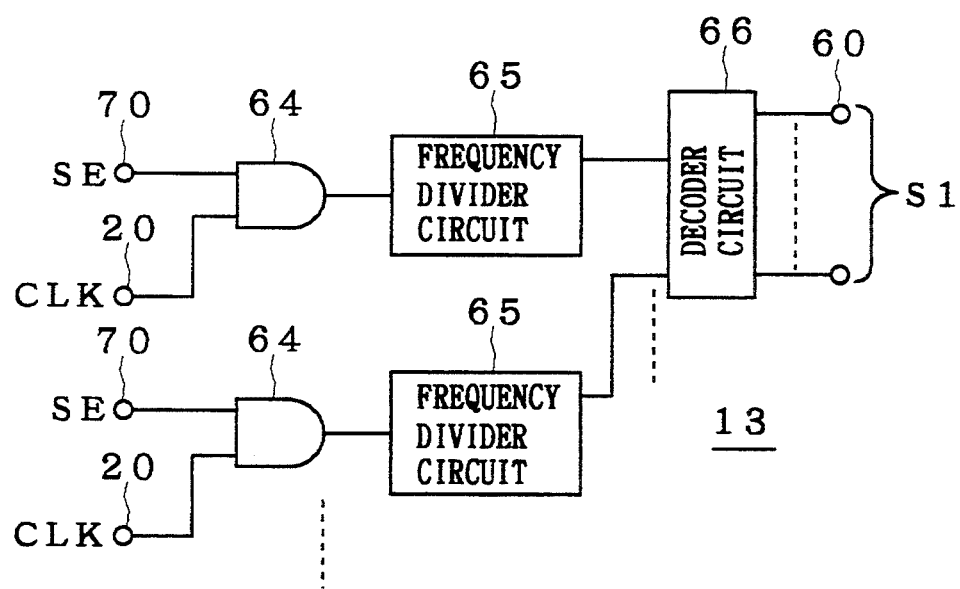
FIG. 6 is a block diagram showing the internal arrangement of a random number generator circuit of the first preferred embodiment.

FIG. 6 illustrates an example of the random number generator circuit 13 of FIG. 2. As shown in FIG. 6, a plurality of AND gates 64 are provided each of which has a first input receiving an enable signal SE from an enable terminal 70 and a second input receiving the clock signal CLK from the clock input terminal 20. The respective output of the AND gates 64 are frequency-divided by a plurality of frequency divider circuits 65 which are set to different frequency dividing ratios, and the frequency-divided signals are outputted to a decoder circuit 66.

The decoder circuit 66 receives and decodes the frequency-divided signals from the frequency divider circuits 65 to output the random number signals S1 from a random number signal output terminals 60.

With such arrangements, the enable signal SE is set to "H" and the clock signal CLK is outputted from the AND gates 64 to the corresponding frequency divider circuits 65. The enable signal SE is changed to "L" at a certain time interval, and the decoder circuit 66 decodes the output of the frequency divider circuits 65 (the value corresponding to the count of the clock signal CLK) at that time interval to output the random number signals S1 to the selector circuit 11.

Figure 7:
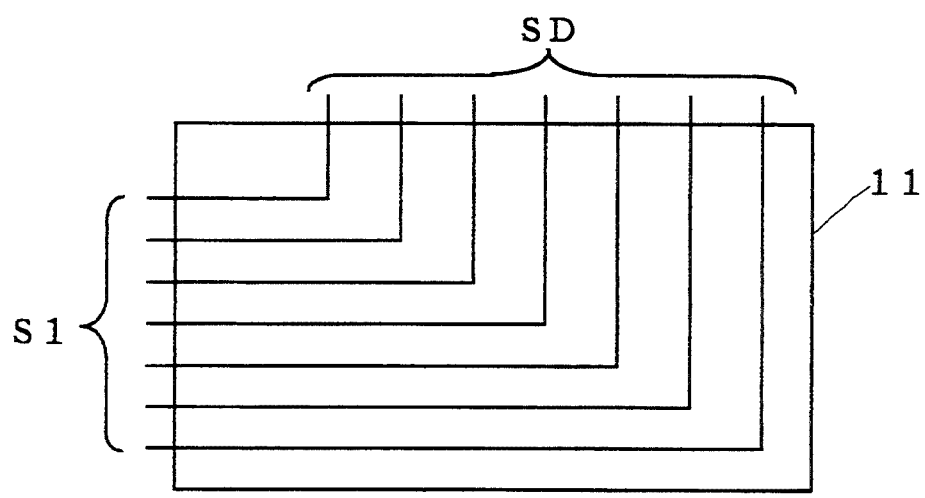
FIGS. 7 to 9 are circuit diagrams showing the internal arrangement of a selector circuit of the first preferred embodiment, respectively.
Figure 8:
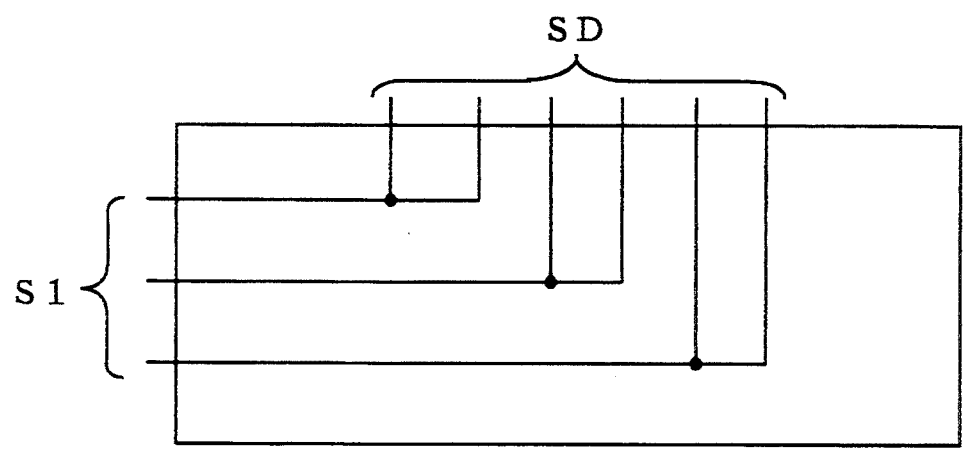
Figure 9:
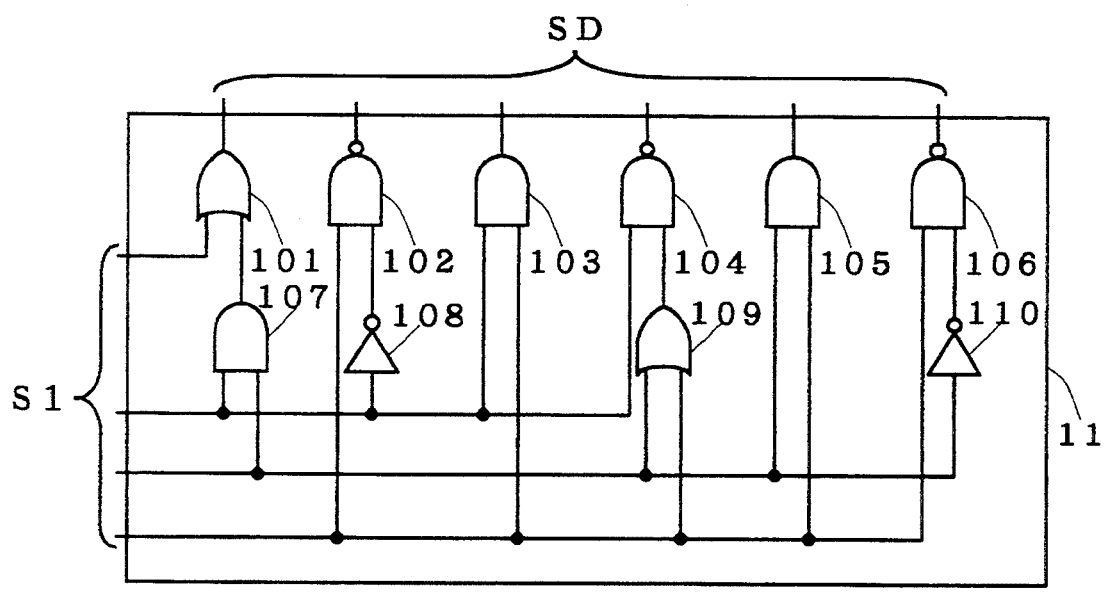

FIGS. 7 to 9 illustrate the internal arrangement of the selector circuit 11. The selector circuit 11 of FIG. 7 outputs the random number signals S1 intactly in the form of the generator polynomial information SD. The selector circuit 11 of FIG. 8 converts the random number signals S1 into the generator polynomial information SD in one-to-plural corresponding relation.

The selector circuit 11 of FIG. 9 includes a combinational circuit receiving the random number signals S1 and performing a logical operation, and outputs the result of the logical operation in the form of the generator polynomial information SD. It should be noted that the combinational circuit includes an NOR gate 101, an NAND gate 102, an AND gate 103, an NAND gate 104, an AND gate 105, an NAND gate 106, an AND gate 107, an inverter 108, an NOR gate 109 and an inverter 110.

Figure 10:
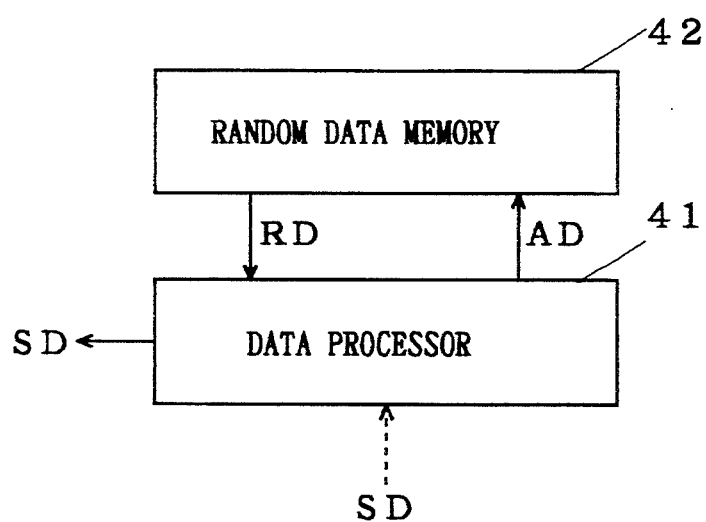
FIG. 10 is a block diagram in which the scrambling or de-scrambling circuit is partially formed by means of a microcomputer according to the first preferred embodiment.

FIG. 10 is a block diagram wherein the selector circuit 11 and random number generator circuit 13 or the data latch circuit 14 is formed by means of a microcomputer. As shown in FIG. 10, a data processor 41 reads the data at an address AD stored in a random data memory 42 by specifying the address AD to the random data memory 42. It should be noted that the random data memory 42 stores various random data RD in response to addresses.

When a microcomputer is used for forming the selector circuit 11 and the random number generator circuit 13, the data processor 41 should read the data stored at an read address AD of the random data memory 42 in the form of the random data RD and generate the generator polynomial information SD on the basis of the random data RD.

Figure 11:
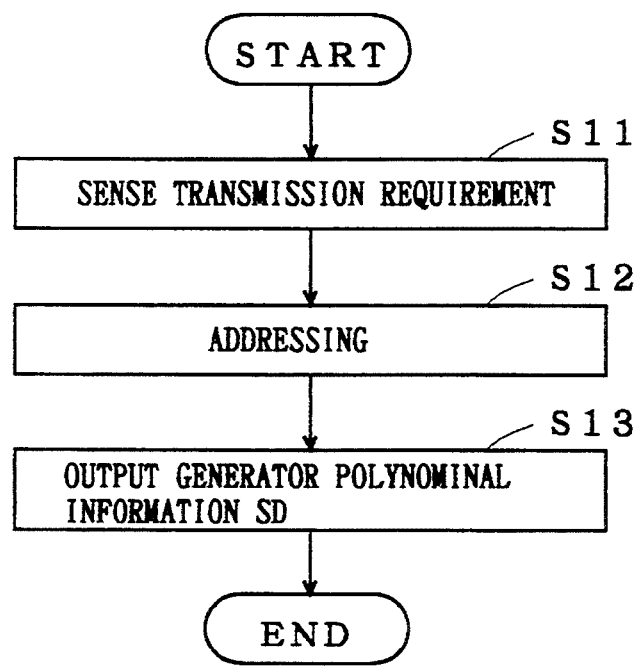
FIGS. 11 and 12 are flow charts showing the operation by the microcomputer of FIG. 10.

Referring to the flow chart of FIG. 11, description will be given hereinafter on the generation of the generator polynomial information SD by the data processor 41. On sensing the transmission requirement of the digital signal transmitter 100 in the step S11, the read address AD is specified to the random data memory 42 in the step S12 and the random data RD stored at the address AD of the random data memory 42 is read. In the step S13, the generator polynomial information SD is calculated on the basis of the random data RD given in the step S12 and is outputted to the quasi-random code generator circuit 1.

When a microcomputer is used to form the data latch circuit 14, the data processor 41 should receive the generator polynomial information SD of the generator polynomial information extracting circuit 16 and output the generator polynomial information SD to the quasi-random code generator circuit 1 while storing it in an internal register.

Figure 12:
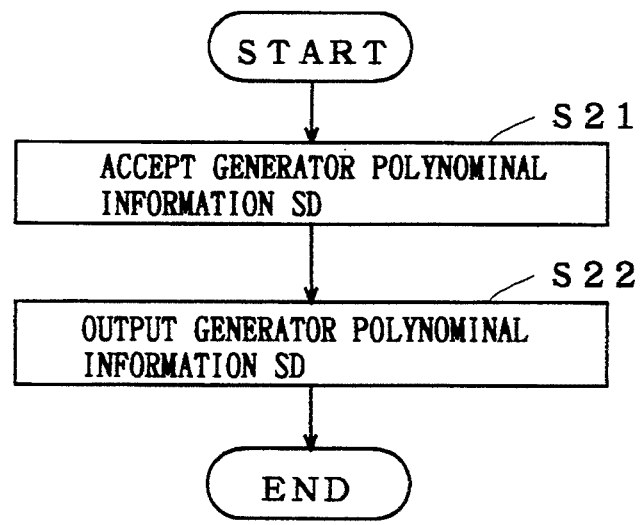

Referring to the flow chart of FIG. 12, description will be given on the data latch operation by the data processor 41. The generator polynomial information SD given from the generator polynomial information extracting circuit 16 is accepted in the step S21. The generator polynomial information SD is latched in an internal register or the like and is outputted to the quasi-random code generator circuit 1 in the step S22.

Figure 13:
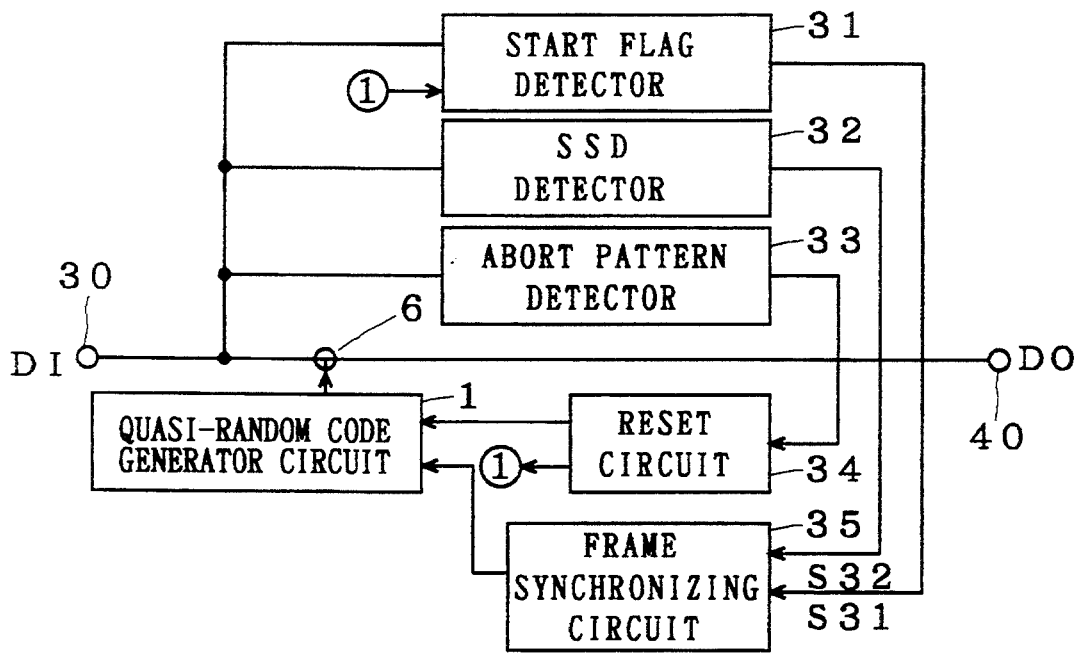
FIG. 13 is a block diagram of a transmission control system of a digital signal transmitter of the first preferred embodiment.

FIG. 13 is a block diagram of a transmission control system for the digital signal transmitter 100. As shown in FIG. 13, a start flag detector 31 outputs the start flag detection signal S31 to a frame synchronizing circuit 35 when the start flag is detected from the input digital signal DI given through the data input terminal 30. It is to be noted that, once the start flag detector 31 outputs the start flag detection signal S31, it detects no start flag until it receives a reset signal from a reset circuit 34.

On detecting the serial generator polynomial signal SSD from the input digital signal DI, an SSD detector 32 outputs the SSD detection signal S32 to the frame synchronizing circuit 35. On detecting the abort pattern from the input digital signal DI, an abort pattern detector 33 outputs an abort pattern detection signal to the reset circuit 34.

The reset circuit 34, on receipt of the abort pattern detection signal, outputs the reset signal to the quasi-random code generator circuit 1 to reset the quasi-random code generator circuit 1. When the quasi-random code generator circuit 1 receives the reset signal, the quasi-random code RP is fixed to "0".

On receipt of the start flag detection signal S31 and SSD detection signal S32, the frame synchronizing circuit 35 outputs a quasi-random code generation start signal to the quasi-random code generator circuit 1. The quasi-random code generator circuit 1, when triggered by the quasi-random code generation start signal, outputs the quasi-random code RP generated from a predetermined initial value on the basis of the generator polynomial determined by the generator polynomial information SD.

Description will be given below on the operation of the transmission control system of the digital signal transmitter 100 for transmission of the packet data of FIG. 4. The start flag detector 31 detects the start flag from the input digital signal DI and outputs the start flag detection signal S31 to the frame synchronizing circuit 35.

Then the SSD detector 32 detects the serial generator polynomial signal SSD to output the SSD detection signal S32 to the frame synchronizing circuit 35, which in turn outputs the quasi-random code generation start signal to the quasi-random code generator circuit 1 to make the quasi-random code generator circuit 1 output the quasi-random code RP. Thus the information from the beginning to the serial generator polynomial signal SSD in the input digital signal DI is not scrambled.

The information following the serial generator polynomial signal SSD in the input digital signal DI is scrambled. Then the abort pattern detector 33 detects the abort pattern indicative of the end of the packet data and outputs the abort pattern detection signal to the reset circuit 34, which in turn outputs the reset signal to the quasi-random code generator circuit 1 and the start flag detector 31. The quasi-random code generator circuit 1 is consequently reset, and the quasi-random code RP is fixed to "0". The scrambling is completed.

Figure 14:
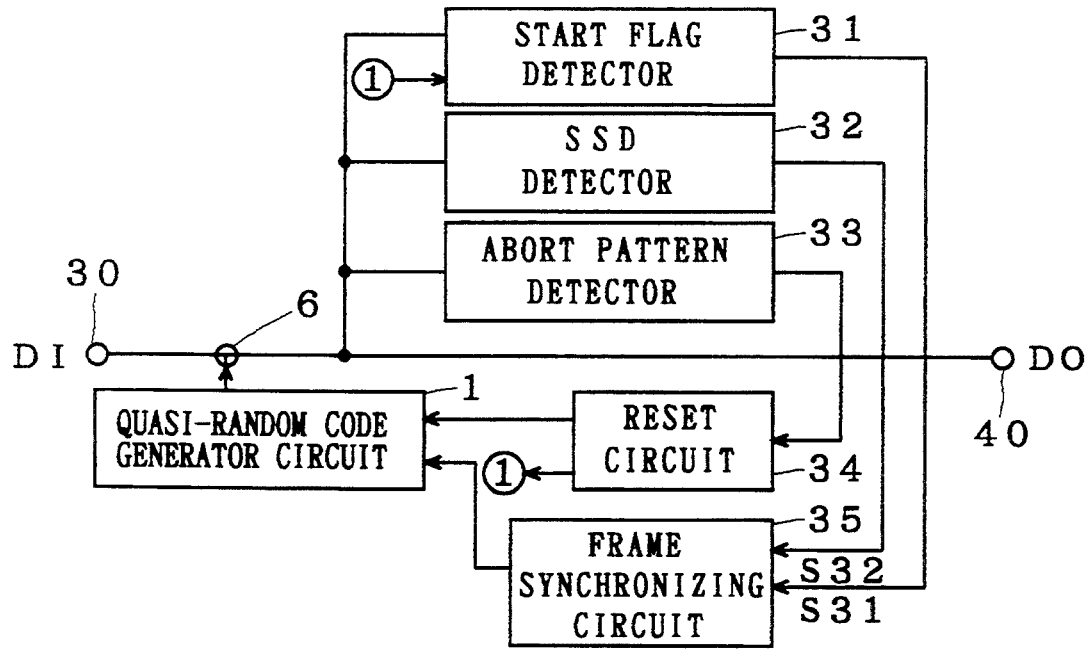
FIG. 14 is a block diagram of a reception control system of a digital signal receiver of the first preferred embodiment.

FIG. 14 is a block diagram of a reception control system for the digital signal receiver 200. As shown in FIG. 14, the start flag detector 31 outputs the start flag detection signal S31 to the frame synchronizing circuit 35 when the start flag is detected from the output digital signal DO given through the data input terminal 30 and exclusive-OR gate 6. Once the start flag detector 31 outputs the start flag detection signal S31, it detects no start flag until it receives the reset signal from the reset circuit 34.

On detecting the serial generator polynomial signal SSD from the output digital signal DO, the SSD detector 32 outputs the SSD detection signal S32 to the frame synchronizing circuit 35. On detecting the abort pattern from the output digital signal DO, the abort pattern detector 33 outputs the abort pattern detection signal to the reset circuit 34.

The reset circuit 34, on receipt of the abort pattern detection signal, outputs the reset signal to the quasi-random code generator circuit 1 to reset the quasi-random code generator circuit 1. When the quasi-random code generator circuit 1 receives the reset signal, the quasi-random code RP is fixed to "0".

The frame synchronizing circuit 35, on receiving the start flag detection signal S31 and SSD detection signal S32, outputs the quasi-random code generation start signal to the quasi-random code generator circuit 1. The quasi-random code generator circuit 1, when triggered by the quasi-random code generation start signal, outputs the quasi-random code RP generated from a predetermined initial value on the basis of the generator polynomial determined by the generator polynomial information SD.

Description will be given below on the operation of the reception control system of the digital signal receiver 200 for reception of the packet data of FIG. 4. The start flag detector 31 detects the start flag from the output digital signal DO and outputs the start flag detection signal S31 to the frame synchronizing circuit 35. At this time, the quasi-random code generator circuit 1 has been reset and the quasi-random code RP is fixed to "0", so that the input digital signal DI becomes the output digital signal DO.

Then the SSD detector 32 detects the serial generator polynomial signal SSD to output the SSD detection signal S32 to the frame synchronizing circuit 35. At this time, the quasi-random code RP is fixed to "0", so that the input digital signal DI becomes the output digital signal DO.

The frame synchronizing circuit 35 then outputs the quasi-random code generation start signal to the quasi-random code generator circuit 1 to make the quasi-random code generator circuit 1 output the quasi-random code RP based on the generator polynomial information SD. Thus the information following the serial generator polynomial signal SSD in the output digital signal DO is provided by de-scrambling the input digital signal DI. De-scrambling is subsequently performed in order.

The abort pattern detector 33 then detects the abort pattern indicative of the end of the packet data and outputs the abort pattern detection signal to the reset circuit 34, which in turn outputs the reset signal to the quasi-random code generator circuit 1 and the start flag detector 31. The quasi-random code generator circuit 1 is consequently reset and the quasi-random code RP is fixed to "0". The de-scrambling is completed.

As above described, the digital signal processing system of the first preferred embodiment changes the generator polynomial for each packet to transmit and receive the scrambled/de-scrambled digital signal. This provides for communication with the use of the scrambled digital signal which is difficult to decode.

<Second Preferred Embodiment>

Figure 15:
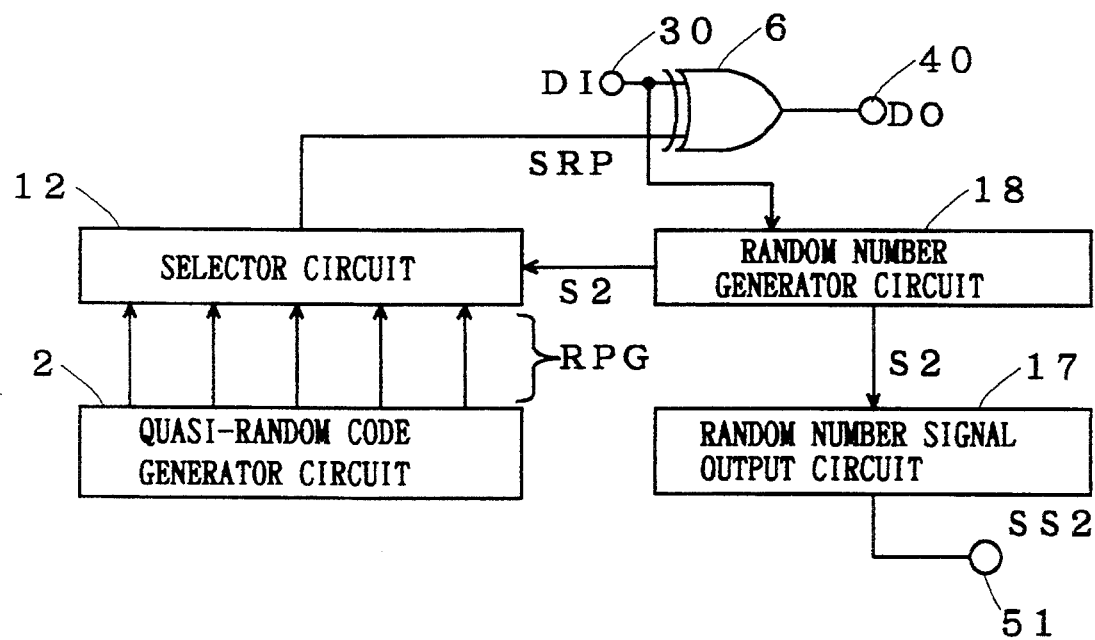
FIG. 15 is a block diagram of the scrambling circuit according to a second preferred embodiment of the present invention.

FIG. 15 is a block diagram of the scrambling circuit 21 in the digital signal processing system according to a second preferred embodiment of the present invention. The general construction of the digital signal processing system of the second preferred embodiment is identical with that of the first preferred embodiment of FIG. 1.

A random number generator circuit 18 generates a random number signal S2 and outputs it to a selector circuit 12, as shown in FIG. 15.

A quasi-random code generator circuit 2 applies the respective output of a plurality of D flip-flops included therein to the selector circuit 12 in the form of a quasi-random code group RPG. It should be noted that the quasi-random code generator circuit 2 outputs the quasi-random code group RPG by using a previously fixed generator polynomial.

The selector circuit 12 outputs one quasi-random code RP in the quasi-random code group RPG as a selected quasi-random code SRP in response to the random number signal S2.

A random number signal output circuit 17 parallel-to-serial converts the random number signal S2 to output a serial random number signal SS2 from a random number signal output terminal 51. Thus the transmitter is enabled to recognize the random number signal S2 from the serial random number signal SS2 given through the random number signal output terminal 51.

The exclusive-OR gate 6 has a first input receiving the input digital signal DI through the data input terminal 30 and a second input receiving the selected quasi-random code SRP from the quasi-random code generator circuit 2, and scrambles the input digital signal DI by calculating the exclusive-OR of the input digital signal DI and the selected quasi-random code SRP to output the scrambled output digital signal DO through the data output terminal 40. The output digital signal DO is transmitted from the digital signal transmitter 100.

Figure 16:
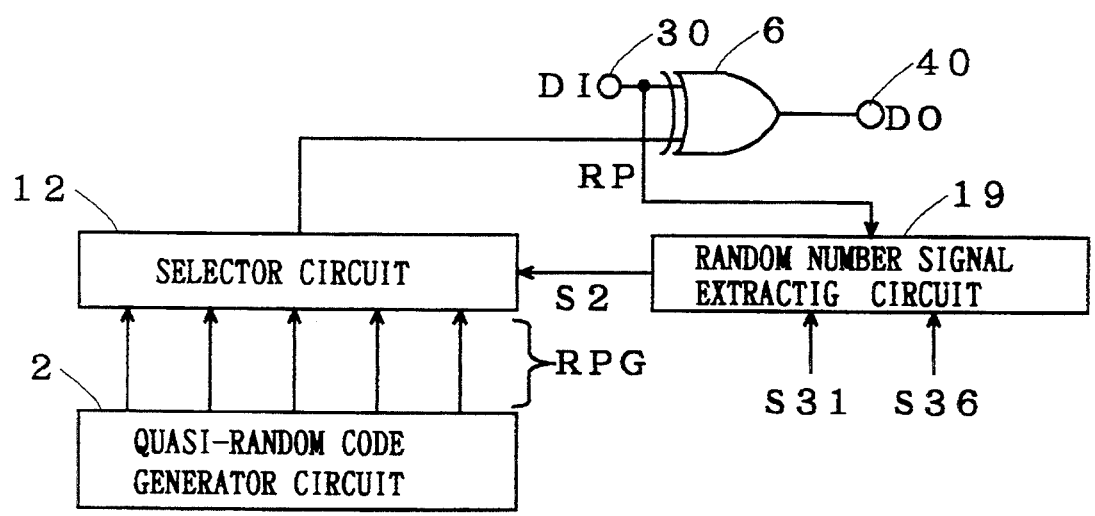
FIG. 16 is a block diagram of the de-scrambling circuit according to the second preferred embodiment.

FIG. 16 is a block diagram of the de-scrambling circuit 22 in the digital signal receiver 200 of FIG. 1. As shown in FIG. 16, a random number signal extracting circuit 19 extracts the serial random number signal SS2 from the input digital signal DI given through the data input terminal 30 and serial-to-parallel converts the extracted serial random number signal SS2 to output the random number signal S2 to the selector circuit 12. It is to be noted that the random number signal extracting circuit 19 can extract the serial random number signal SS2 in the input digital signal DI on the basis of the start flag detection signal S31 and an SS2 detection signal S36.

The quasi-random code generator circuit 2 applies the respective output of a plurality of D flip-flops included therein to the selector circuit 12 in the form of the quasi-random code group RPG.

The selector circuit 12 outputs one quasi-random code RP in the quasi-random code group RPG as the selected quasi-random code SRP in response to the random number signal S2.

The exclusive-OR gate 6 has a first input receiving the input digital signal DI through the data input terminal 30 and a second input receiving the selected quasi-random code SRP from the quasi-random code generator circuit 2, and de-scrambles the input digital signal DI by calculating the exclusive-OR of the input digital signal DI and the selected quasi-random code SRP to output the de-scrambled output digital signal DO through the data output terminal 40.

The digital signal receiver 200 is enabled to obtain real data from the de-scrambled output digital signal DO.

Figure 17:
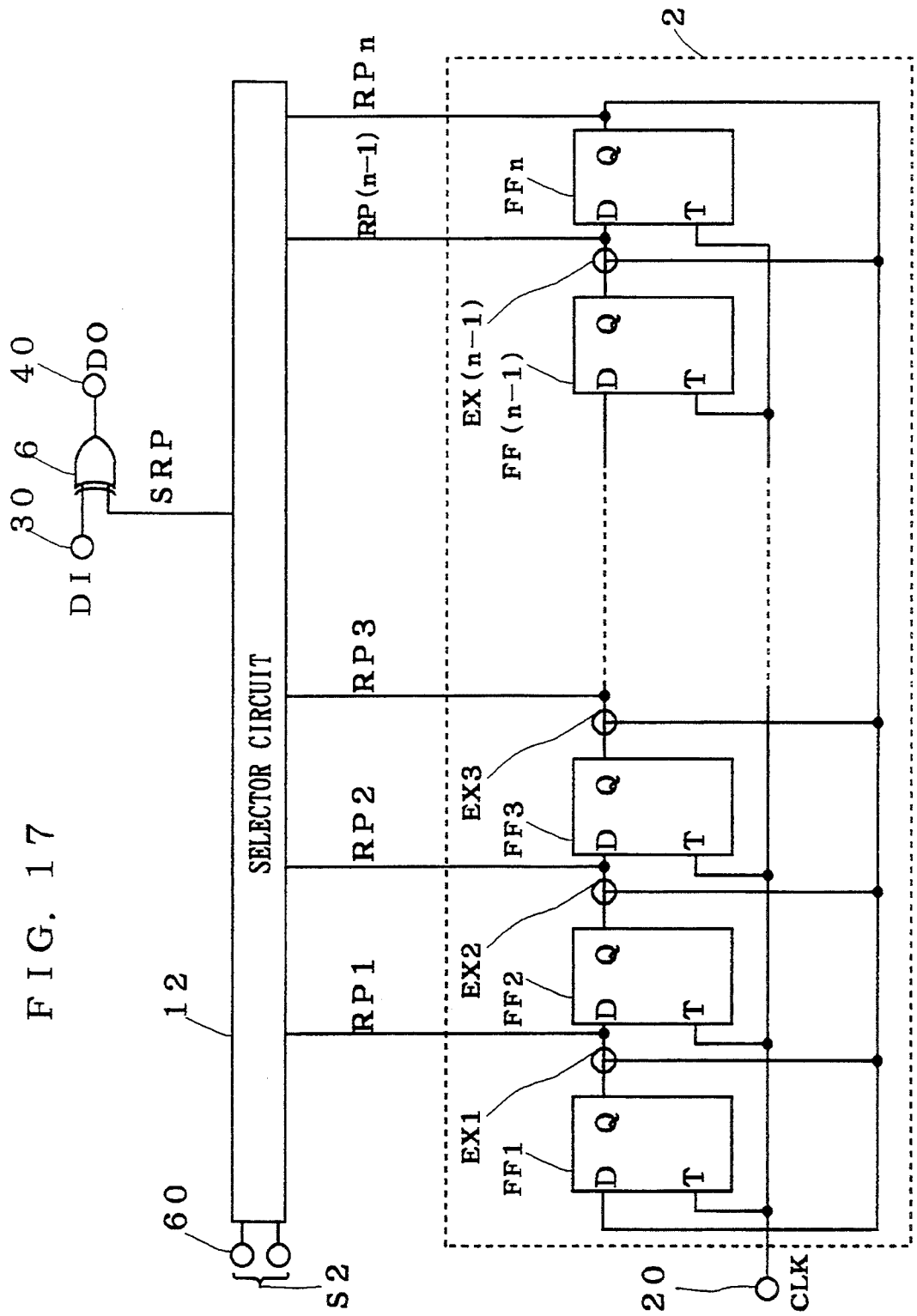
FIG. 17 is a circuit diagram showing the internal arrangement of the quasi-random code generator circuit of the second preferred embodiment.

FIG. 17 is a circuit diagram showing the details of the quasi-random code generator circuit 2 of FIGS. 15 and 16. The quasi-random code generator circuit 2 includes n D flip-flops FF1 to FFn and (n−1) exclusive-OR gates EX1 to EX(n−1), as shown in FIG. 17.

The D-input of the D flip-flop FF1 is connected to the Q-output of the D flip-flop FFn. The Q-output of the D flip-flop FFi (i=1 to (n−1)) is applied to a first input of the exclusive-OR gate EXi. The Q-output of the D flip-flop FFn is applied to a second input of the exclusive-OR gate EXi. The output of the exclusive-OR gate EXi is applied to the D-input of the D flip-flop FF(i+1).

The clock signal CLK is applied to the respective T-input of the D flip-flops FF1 to FFn in common through the clock input terminal 20.

To the selector circuit 12 is outputted the quasi-random code group RPG (RP1 to RPn) having the quasi-random codes RP1 to RP(n−1) outputted from the exclusive-OR gates EX1 to EX(n−1) and the quasi-random code RPn outputted from the D flip-flop FFn.

The selector circuit 12 selects one quasi-random code RPi in the quasi-random code group RPG in response to the random number signal S2 to output the selected quasi-random code SRP.

The quasi-random code SRP selected from the quasi-random code group RPG is outputted although the quasi-random code generator circuit 2 has the fixed generator polynomial. This provides the scrambled output digital signal DO which is more difficult to decode than the prior art signals.

Figure 18:
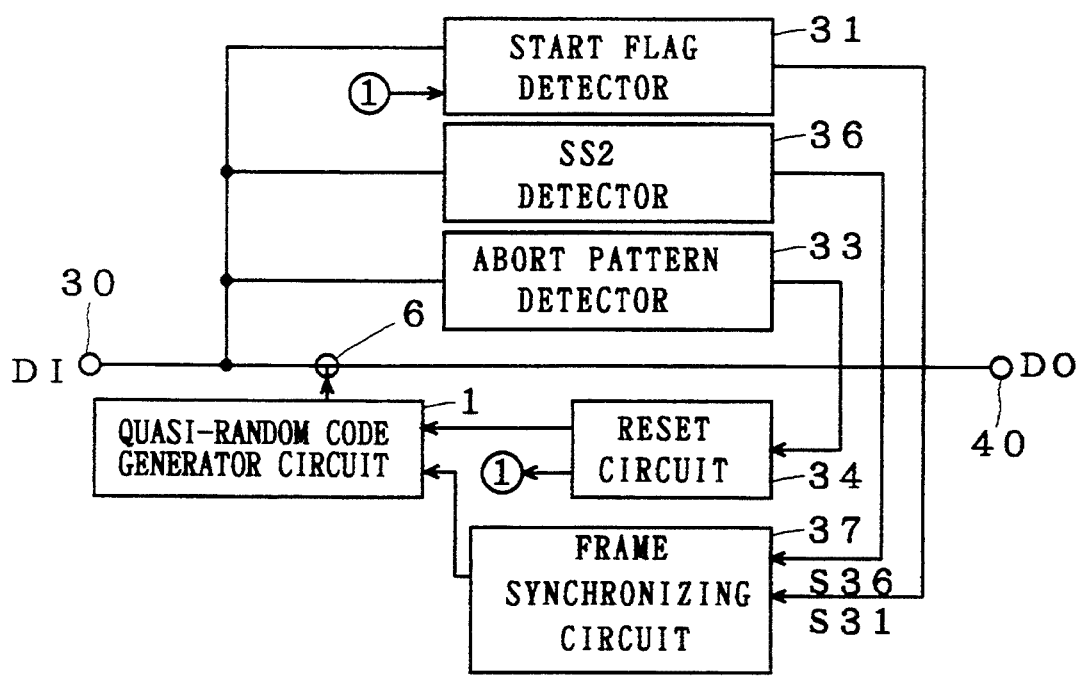
FIG. 18 is a block diagram of the transmission control system of the digital signal transmitter of the second preferred embodiment.

FIG. 18 is a block diagram of the transmission control system for the digital signal transmitter 100 in the digital signal processing system according to the second preferred embodiment. As shown in FIG. 18, an SS2 detector 36 outputs the SS2 detection signal S36 to a frame synchronizing circuit 37 when the serial random number signal SS2 is detected from the output digital signal DO. On receipt of the start flag detection signal S31 and SS2 detection signal S36, the frame synchronizing circuit 37 outputs the quasi-random code generation start signal to the quasi-random code generator circuit 1.

Other arrangements of the transmission control system of the second preferred embodiment are identical with those of the transmission control system of the first preferred embodiment shown in FIG. 13, and the description thereof will be omitted herein. The transmission control operation of the second preferred embodiment is generally the same as that of the first preferred embodiment except that the processing of the serial random number signal SS2 is substituted for that of the serial generator polynomial signal SSD.

Figure 19:
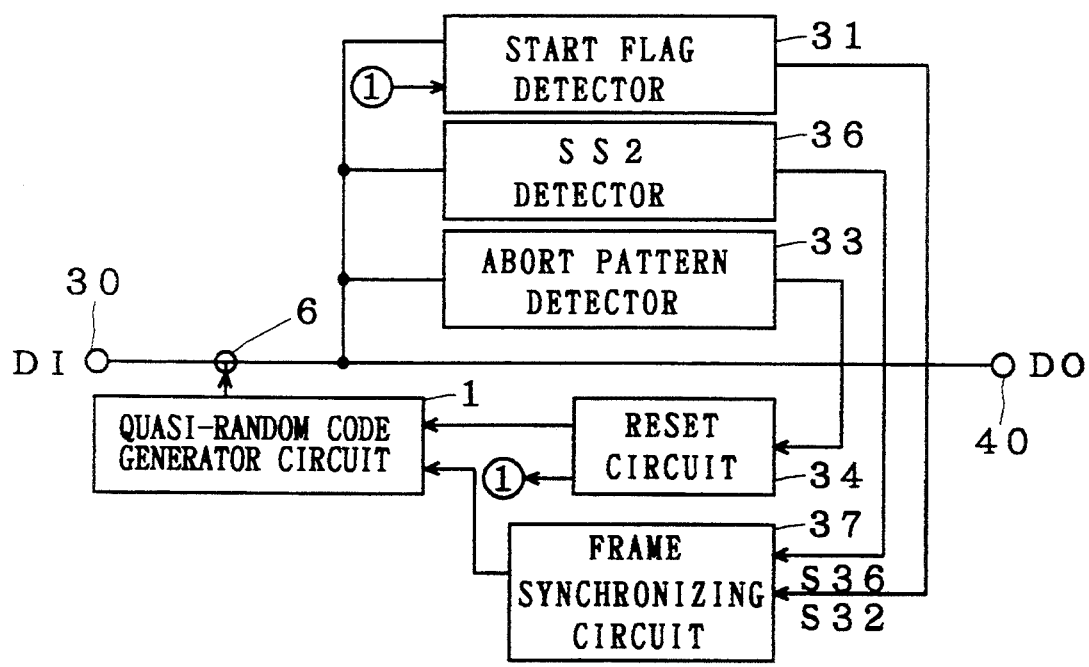
FIG. 19 is a block diagram of the reception control system of the digital signal receiver of the second preferred embodiment.

FIG. 19 is a block diagram of the reception control system for the digital signal receiver 200 in the digital signal processing system according to the second preferred embodiment. As shown in FIG. 19, the SS2 detector 36 outputs the SS2 detection signal S36 to the frame synchronizing circuit 37 when the serial random number signal SS2 is detected from the output digital signal DO. On receipt of the start flag detection signal S31 and SS2 detection signal S36, the frame synchronizing circuit 37 outputs the quasi-random code generation start signal to the quasi-random code generator circuit 1.

Other arrangements of the reception control system of the second preferred embodiment are identical with those of the reception control system of the first preferred embodiment shown in FIG. 14, and the description thereof will be omitted herein. The reception control operation of the second preferred embodiment is generally the same as that of the first preferred embodiment except that the processing of the serial random number signal SS2 is substituted for that of the serial generator polynomial signal SSD.

The random number generator circuit 18 may be of the same construction as the random number generator circuit 13 of the first preferred embodiment. A microcomputer may be substituted for the random number generator circuit 18 and selector circuit 12 of the scrambling circuit 21 or the selector circuit 12 of the descrambling circuit 22 in the same manner as in the first preferred embodiment.

The packet data arrangement used for transmission and reception is substantially the same as that of FIG. 4 except that the serial random number signal SS2 is used in place of the serial generator polynomial signal SSD.

As above described, the digital signal processing system of the second preferred embodiment changes the quasi-random codes RP to be selected from the quasi-random code group RPG for each packet to transmit and receive the scrambled/de-scrambled digital signal. This provides for :Communication with the use of the scrambled digital signal which is difficult to decode.

<Third Preferred Embodiment>

Figure 20:
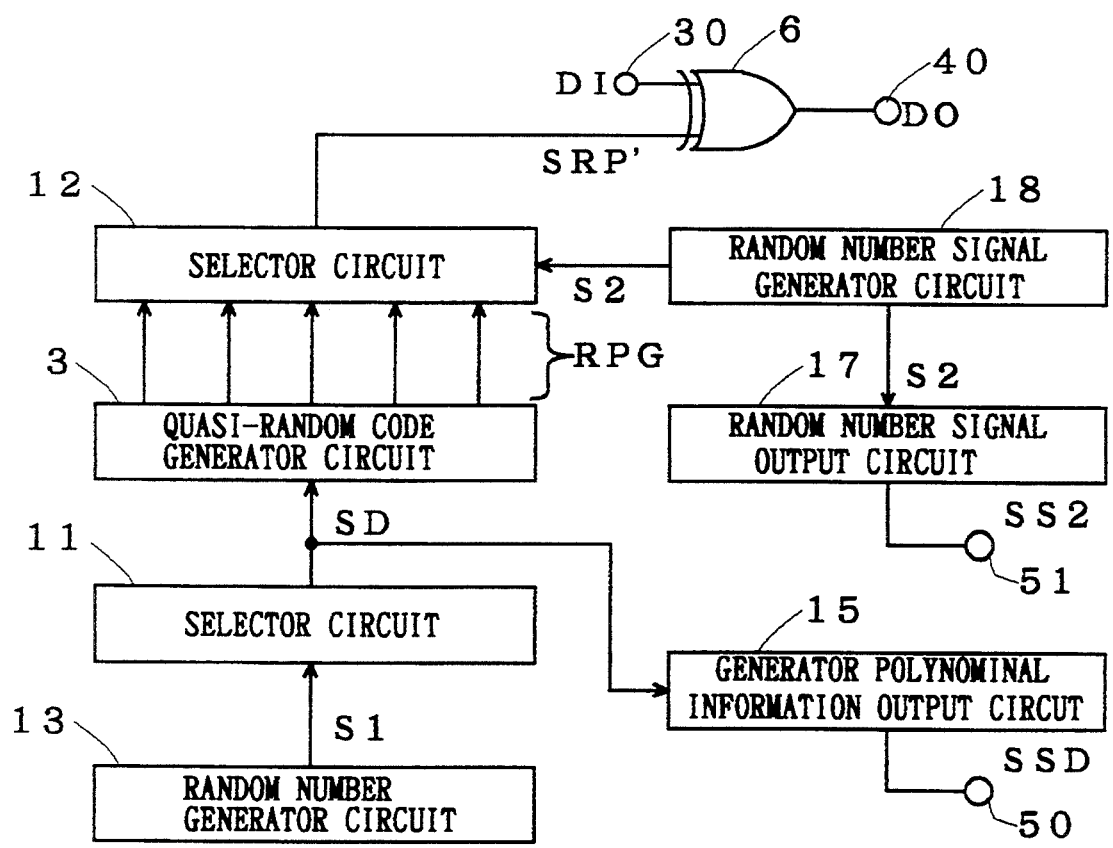
FIG. 20 is a block diagram of the scrambling circuit according to a third preferred embodiment of the present invention.

FIG. 20 is a block diagram of the scrambling circuit 21 in the digital signal processing system according to a third preferred embodiment of the present invention. The general construction of the digital signal processing system of the third preferred embodiment is identical with that of the first preferred embodiment of FIG. 1.

Referring to FIG. 20, the random number generator circuit 13 generates the random number signal S1, which is outputted to the selector circuit 11. The selector circuit 11 generates the generator polynomial information SD in response to the random number signal S1, which is outputted to a quasi-random code generator circuit 3. The generator polynomial information output circuit 15 parallel-to-serial converts the generator polynomial information SD into the serial generator polynomial signal SSD, which is outputted from the generator polynomial information output terminal 50. Thus the transmitter can recognize the generator polynomial information SD from the serial generator polynomial signal SSD given through the generator polynomial information output terminal 50.

The quasi-random code generator circuit 3 receives the generator polynomial information SD from the selector circuit 11 and outputs to the selector circuit 12 the quasi-random code group RPG including the respective output of a plurality of D flip-flops provided therein by using the generator polynomial determined based on the generator polynomial information SD.

The random number generator circuit 18 generates the random number signal S2 and outputs it to the selector circuit 12.

The selector circuit 12 outputs one quasi-random code RP in the quasi-random code group RPG as a selected quasi-random code SRP' in response to the random number signal S2.

The random number signal output circuit 17 parallel-to-serial converts the random number signal S2 into the serial random number signal SS2, which is outputted from the random number signal output terminal 51. Thus the transmitter can recognize the random number signal S2 from the serial random number signal SS2 given through the random number signal output terminal 51.

The exclusive-OR gate 6 has a first input receiving the input digital signal DI given through the data input terminal 30 and a second input receiving the selected quasi-random code SRP' from the quasi-random code generator circuit 3, and scrambles the input digital signal DI by calculating the exclusive-OR of the input digital signal DI and the selected quasi-random code SRP' to output the scrambled output digital signal DO through the data output terminal 40. The output digital signal DO is transmitted from the digital signal transmitter 100.

Figure 21:
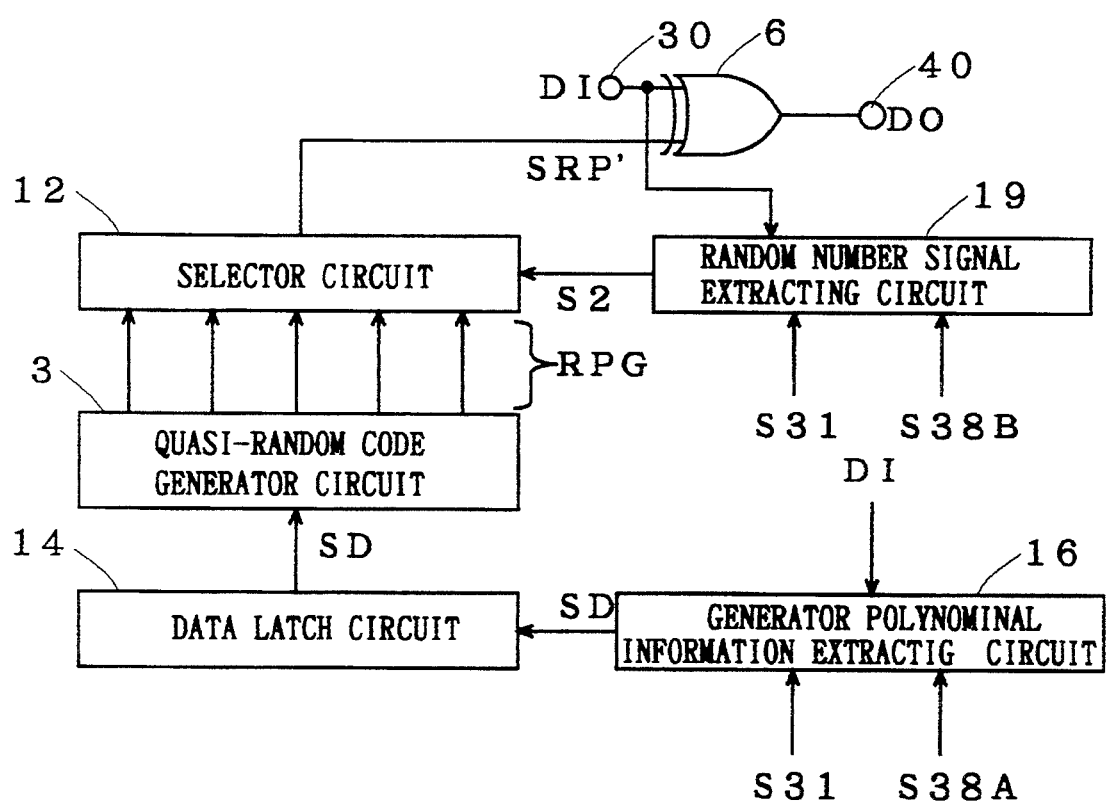
FIG. 21 is a block diagram of the de-scrambling circuit according to the third preferred embodiment.

FIG. 21 is a block diagram of the de-scrambling circuit 22 in the digital signal receiver 200 of FIG. 1. As shown in FIG. 21, the generator polynomial information extracting circuit 16 extracts the serial generator polynomial signal SSD from the input digital signal DI given through the data input terminal 30 and serial-to-parallel converts the extracted serial generator polynomial signal SSD to output the generator polynomial information SD to the data latch circuit 14. It is to be noted that the generator polynomial information extracting circuit 16 can recognize the serial generator polynomial signal SSD in the input digital signal DI on the basis of the start flag detection signal S31 indicative of the start of the packet data and an SSD detection signal S38A (to be described later) indicative of the detection of the serial generator polynomial signal SSD, to extract the serial generator polynomial signal SSD.

The quasi-random code generator circuit 3 receives the generator polynomial information SD from the data latch circuit 14 and outputs to the selector circuit 12 the quasi-random code group RPG including the respective output of a plurality of D flip-flops provided therein by using the generator polynomial determined based on the generator polynomial information SD.

The random number signal extracting circuit 19 extracts the serial random number signal SS2 from the input digital signal DI given through the data input terminal 30 and serial-to-parallel converts the extracted serial random number signal SS2 and outputs the random number signal S2 to the selector circuit 12. It should be noted that the random number signal extracting circuit 19 can extract the serial random number signal SS2 in the input digital signal DI on the basis of the start flag detection signal S31 and an SS2 detection signal S38B (to be described later).

The selector circuit 12 outputs one quasi-random code RP in the quasi-random code group RPG as the selected quasi-random code SRP' in response to the random number signal S2.

The exclusive-OR gate 6 has a first input receiving the input digital signal DI given through the data input terminal 30 and a second input receiving the selected quasi-random code SRP' from the quasi-random code generator circuit 3, and de-scrambling the input digital signal DI by calculating the exclusive-OR of the input digital signal DI and the selected quasi-random code SRP' to output the de-scrambled output digital signal DO through the data output terminal 40.

The digital signal receiver 200 is enabled to obtain real data from the de-scrambled output digital signal DO.

Figure 22:
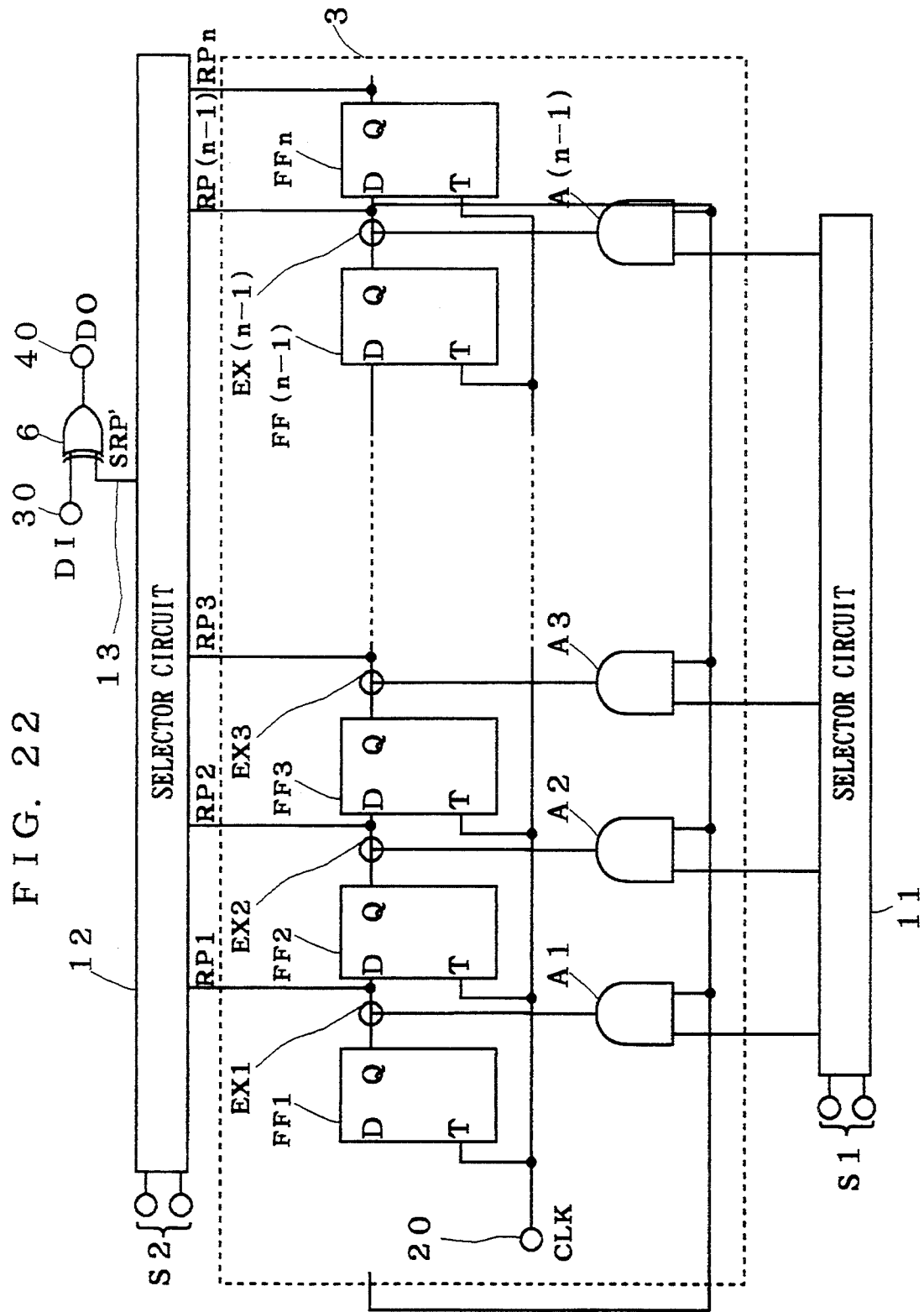
FIG. 22 is a circuit diagram showing the internal arrangement of the quasi-random code generator circuit of the third preferred embodiment.

FIG. 22 is a circuit diagram showing the details of the quasi-random code generator circuit 3 of FIGS. 20 and 21. The quasi-random code generator circuit 3 includes n D flip-flops FF1 to FFn, (n−1) exclusive-OR gates EX1 to EX(n−1), and (n−1) AND gates A1 to A(n−1), as shown in FIG. 22.

The D-input of the D flip-flop FF1 is connected to the Q-output of the D flip-flop FFn. The Q-output of the D flip-flop FFn is connected to respective first input of the AND gates A1 to A(n−1) in common. The bit information SD1 to SD(n−1) of the generator polynomial information SD outputted from the selector circuit 11 is applied respectively to a second input of the AND gates A1 to A(n−1).

The Q-output of the D flip-flop FFi (i=1 to (n−1)) is applied to a first input of the exclusive-OR gate EXi. The output of the AND gate Ai is applied to a second input of the exclusive-OR gate EXi. The output of the exclusive-OR gate EXi is applied to the D-input of the D flip-flop FF(i+1).

The clock signal CLK is applied to the respective T-input of the D flip-flops FF1 to FFn in common through the clock input terminal 20.

To the selector circuit 12 is outputted the quasi-random code group RPG (RP1 to RPn) having the quasi-random codes RP1 to RP(n−1) outputted from the exclusive-OR gates EX1 to EX(n−1) and the quasi-random code RPn outputted from the D flip-flop FFn.

The selector circuit 12 selects one quasi-random code RP in the quasi-random code group RPG in response to the random number signal S2 to output the selected quasi-random code SRP'.

The generator polynomial is determined uniquely by the number of connected D flip-flops FF, the number of exclusive-OR gates EX, and the positions of the exclusive-OR gates EX. For this reason, the quasi-random code generator circuit 3 may change the generator polynomial by changing the number and positions of the exclusive-OR gates EX on the basis of the generator polynomial information SD.

In addition, since the quasi-random code SRP selected from the quasi-random code group RPG is outputted, the scrambled output digital signal DO is more difficult to decode.

The random number generator circuit 18 may be of the same construction as the random number generator circuit 13 of the first preferred embodiment. A microcomputer may be substituted for the random number generator circuit 18 and selector circuit 12 of the scrambling circuit 21 or the selector circuit 12 of the de-scrambling circuit 22 in the same manner as in the first preferred embodiment.

Figure 23:
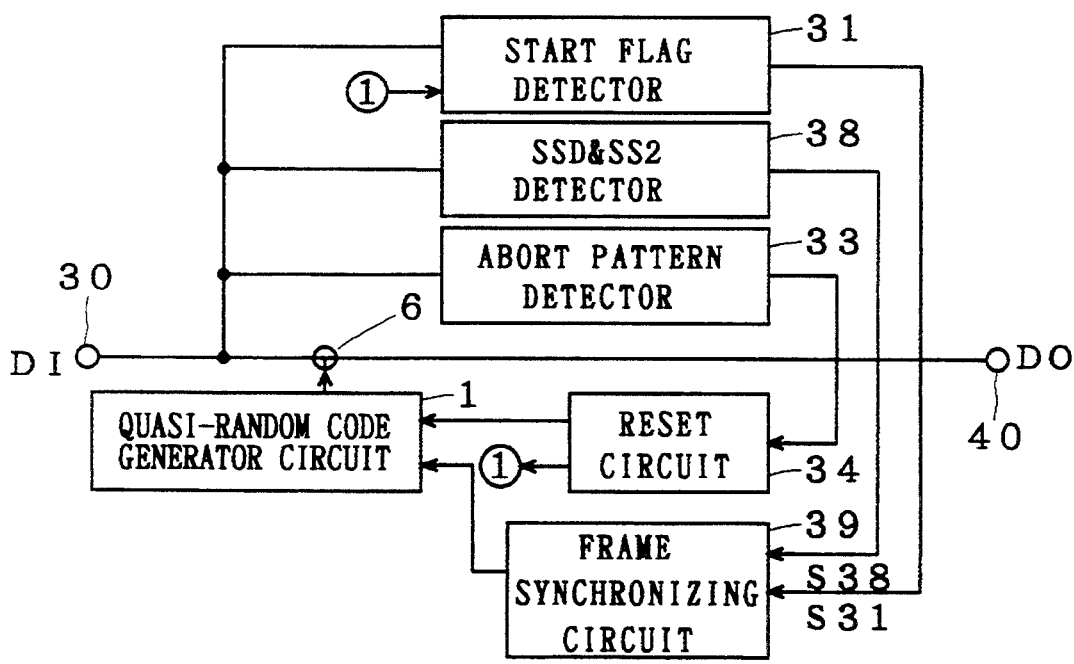
FIG. 23 is a block diagram of the transmission control system of the digital signal transmitter of the third preferred embodiment.
Figure 24:
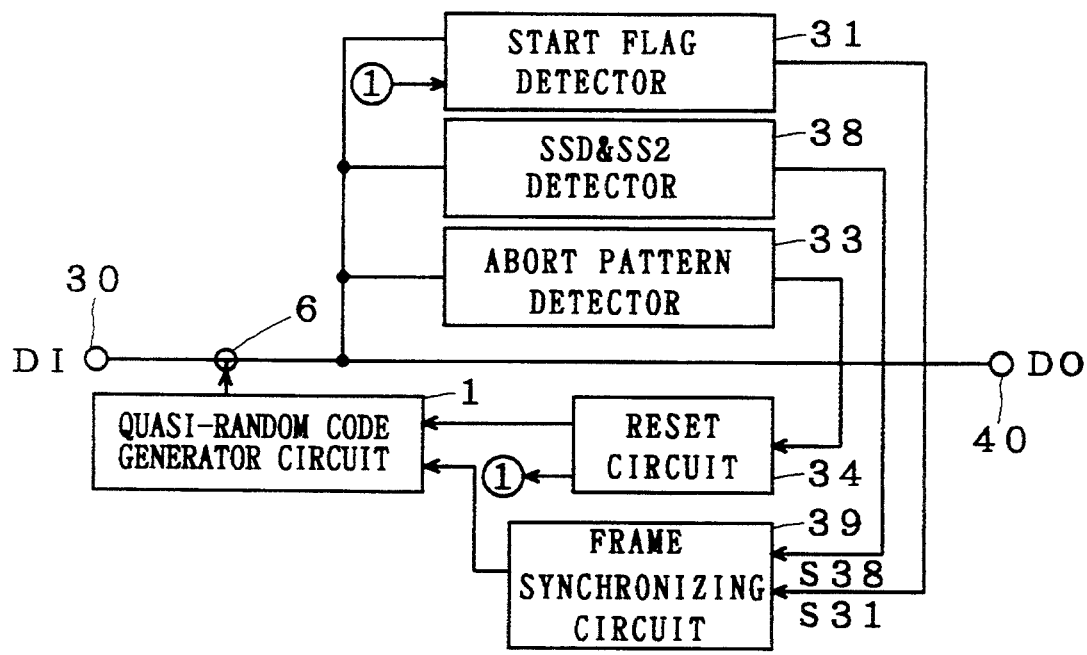
FIG. 24 is a block diagram of the reception control system of the digital signal receiver of the third preferred embodiment.
Figure 25:
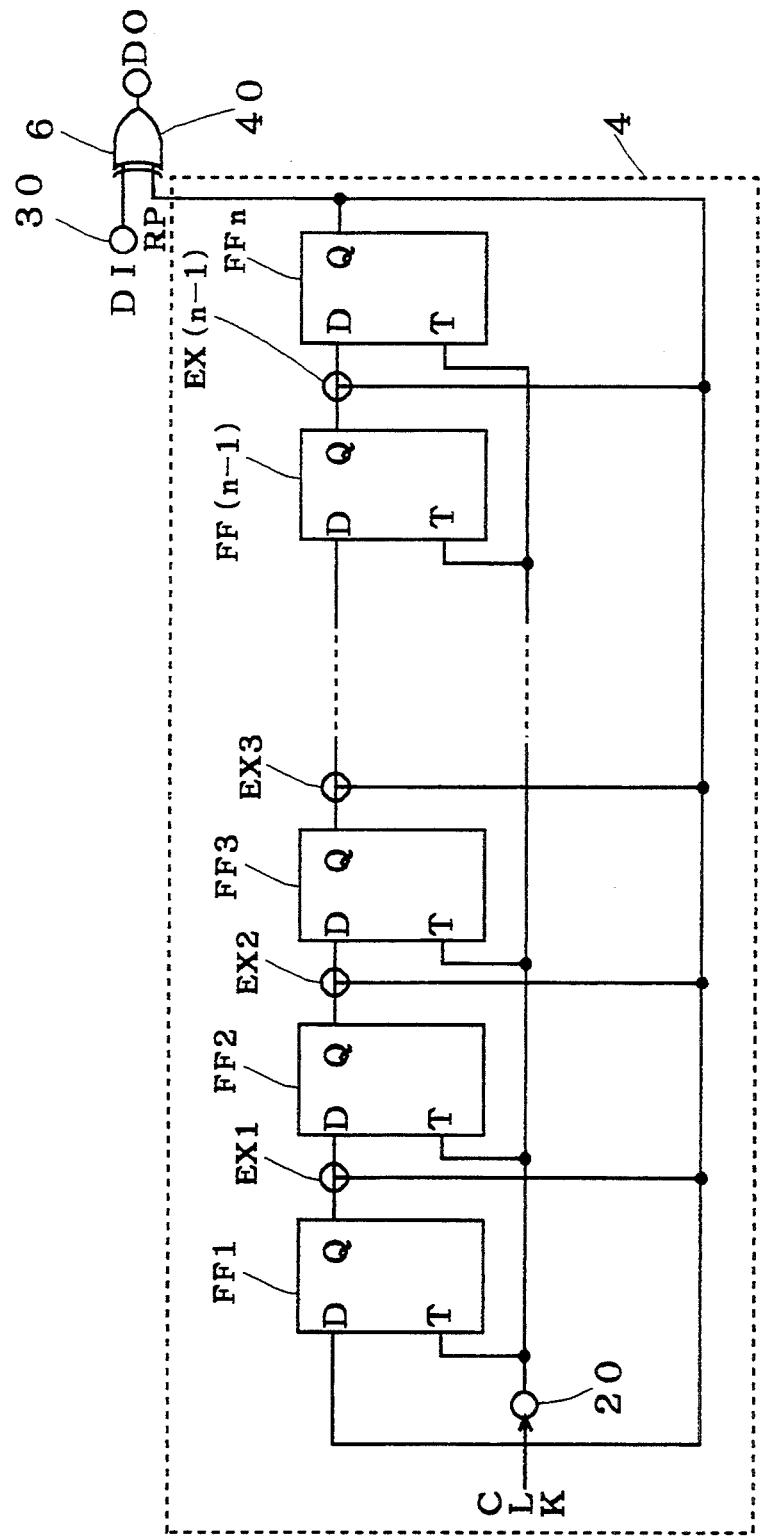
FIG. 25 is a circuit diagram showing the internal arrangement of a conventional quasi-random code generator circuit.
Figure 26:
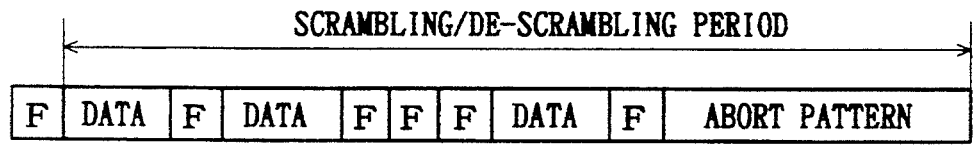
FIG. 26 illustrates conventional packet data.

FIG. 23 is a block diagram of the transmission control system for the digital signal transmitter 100 in the digital signal processing system according to the third preferred embodiment of the present invention. As shown in FIG. 24, an SSD & SS2 detector 38 outputs the SSD detection signal S38A to a frame synchronizing circuit 39 on detecting the serial generator polynomial signal SSD from the output digital signal DO and outputs the SS2 detection signal S38B to the frame synchronizing circuit 39 on detecting the serial random number signal SS2 which follows the serial generator polynomial signal SSD from the output digital signal DO. On receiving the start flag detection signal S31 and the SSD & SS2 detection signal S38 (S38A, S38B), the frame synchronizing circuit 39 outputs the quasi-random code generation start signal to the quasi-random code generator circuit 3.

Other arrangements of the transmission control system of the third preferred embodiment are identical with those of the transmission control system of the first preferred embodiment shown in FIG. 13, and the description thereof will be omitted herein. The transmission control operation of the third preferred embodiment is substantially the same as that of the first preferred embodiment except that the processing of the serial generator polynomial signal SSD and serial random number signal SS2 is substituted for the processing of the serial generator polynomial signal SSD.

FIG. 24 is a block diagram of the reception control system for the digital signal receiver 200 in the digital signal processing system according to the third preferred embodiment. As shown in FIG. 24, the SSD & SS2 detector 38 outputs the SSD detection signal S38A to the frame synchronizing circuit 39 on detecting the serial generator polynomial signal SSD from the output digital signal DO and outputs the SS2 detection signal S38B to the frame synchronizing circuit 39 on detecting the serial random number signal SS2 which follows the serial generator polynomial signal SSD from the output digital signal DO. On receiving the start flag detection signal S31 and the SSD & SS2 detection signal S38 (S38A, S28B), the frame synchronizing circuit 39 outputs the quasi-random code generation start signal to the quasi-random code generator circuit 3.

Other arrangements of the reception control system of the third preferred embodiment are identical with those of the reception control system of the first preferred embodiment shown in FIG. 14, and the description thereof will be omitted herein. The reception control operation of the third preferred embodiment is substantially the same as that of the first preferred embodiment except that the processing of the serial generator polynomial signal SSD and serial random number signal SS2 is substituted for the processing of the serial generator polynomial signal SSD.

The packet data arrangement of the third preferred embodiment is substantially the same as that of FIG. 4 except that the serial random number signal SS2 is positioned which follows the serial generator polynomial signal SSD in the third preferred embodiment.

As above described, the digital signal processing system of the third preferred embodiment changes the generator polynomial for each packet and changes for each packet the quasi-random code RP to be selected from the random code group RPG generated using the generator polynomial to transmit and receive the scrambled/de-scrambled digital signal. This provides for communication with the use of the scrambled digital signal which is difficult to decode.

While the invention has been shown and described in detail, the foregoing description is in all aspects illustrative and not restrictive. It is therefore understood that numerous modifications and variations can be devised without departing from the scope of the invention.

What is claimed:

1. A digital signal processing system including a digital signal transmitter having scrambling means for scrambling a digital signal by said scrambling means to transmit a scrambled digital signal, and a digital signal receiver having de-scrambling means and receiving said scrambled digital signal for de-scrambling said scrambled digital signal by said de-scrambling means to provide a de-scrambled digital signal, said scrambling means comprising:

generator polynomial information generating means for generating generator polynomial information specifying a generator polynomial;

first quasi-random code generating means receiving said generator polynomial information for outputting a quasi-random code in accordance with said specified generator polynomial determined based on said generator polynomial information; and scrambling arithmetic means for generating said scrambled digital signal for each packet containing scrambled digital information provided by performing scrambling arithmetic on a part of a digital signal to be transmitted and said quasi-random code and generator polynomial associated information associated with said generator polynomial information which is not scrambled, said de-scrambling means comprising:

generator polynomial information extracting means for extracting said generator polynomial associated information in said scrambled digital signal to output said said generator polynomial information on the basis of said generator polynomial associated information;

second quasi-random code generating means receiving said generator polynomial information for outputting a quasi-random code in accordance with a generator polynomial determined based on said generator polynomial information; and de-scrambling arithmetic means for performing de-scrambling arithmetic on said digital information in said scrambled digital signal and said on said quasi-random code to generate said de-scrambled digital signal.

2. The digital signal processing system of claim 1, wherein said generator polynomial information generating means includes:

generator polynomial information selection signal generating means for generating a generator polynomial information selection signal; and generator polynomial information output means for determining said generator polynomial information on the basis of said generator polynomial information selection signal to output said generator polynomial information.

3. The digital signal processing system of claim 2, wherein said generator polynomial information selection signal generating means includes random number generating means based on the clock count of a predetermined clock signal.

4. The digital signal processing system of claim 3, wherein said generator polynomial information output means is a logic circuit having a logical input receiving said generator polynomial information selection signal.

5. The digital signal processing system of claim 2, wherein said scrambling means further comprising:

generator polynomial associated information output means for outputting said generator polynomial associated information to the outside.

6. The digital signal processing system of claim 5, wherein said scrambling arithmetic means includes an exclusive-OR gate having a first input receiving the part of said digital signal to be transmitted and a second input receiving said quasi-random code.

7. The digital signal processing system of claim 6, wherein said de-scrambling arithmetic means includes an exclusive-OR gate having a first input receiving said scrambled digital information and a second input receiving said quasi-random code.

8. The digital signal processing system of claim 6, wherein said generator polynomial information extracting means includes:

a generator polynomial information extracting circuit for extracting said generator polynomial information associated information in said scrambled digital signal to output said generator polynomial information on the basis of said generator polynomial information associated information; and data latch means for latching said generator polynomial information to output said generator polynomial information.

9. The digital signal processing system of claim 8, wherein:

said digital signal to be transmitted contains a start flag positioned at the beginning and said generator polynomial information associated information following said start flag;

said digital signal transmitter further includes first detecting means for outputting a first detection signal upon detecting said start flag from said digital signal to be transmitted, and second detecting means for outputting a second detection signal upon detecting said generator polynomial information associated information from said digital signal to be transmitted; and said generator polynomial information extracting circuit extracts said generator polynomial information associated information in response to said first and second detection signals.

10. The digital signal processing system of claim 9, wherein said generator polynomial information is parallel data, and said generator polynomial information associated information is provided by parallel-to-serial conversion of said generator polynomial information.

11. The digital signal processing system of claim 8, wherein said generator polynomial information generating means includes a microcomputer.

12. The digital signal processing system of claim 11, wherein said data latch means includes a microcomputer.

13. The digital signal processing system of claim 12, wherein said first and second quasi-random code generating means include:

first to n-th (n≧2) flip-flops, the output of said n-th flip-flop being fed back to an input of said first flip-flop;

first to (n−1)-th exclusive-OR gates having a first input receiving the output of an i-th (1≦i≦(n−1)) flip-flop and an output applied to an input of an (i+1)-th flip-flop; and logic control means for outputting first to (n−1)-th logic control signals to a second input of said first to (n−1)-th exclusive-OR gates, respectively, on the basis of said generator polynomial information, and the output of said n-th flip-flop is said quasi-random code.

14. A digital signal processing system including a digital signal transmitter having scrambling means for scrambling a digital signal by said scrambling means to transmit a scrambled digital signal, and a digital signal receiver having de-scrambling means and receiving said scrambled digital signal for de-scrambling said scrambled digital signal by said de-scrambling means to provide a de-scrambled digital signal, said scrambling means comprising:

first quasi-random code generating means for outputting a plurality of quasi-random codes in accordance with a predetermined generator polynomial;

quasi-random code selection signal generating means for generating a quasi-random code selection signal indicative of a quasi-random code to be selected from said plurality of quasi-random codes;

first quasi-random code selecting means receiving said quasi-random code selection signal for outputting the quasi-random code indicated by said quasi-random code selection signal as a selected quasi-random code; and scrambling arithmetic means for generating said scrambled digital signal for each packet containing scrambled digital information provided by performing scrambling arithmetic on a part of a digital signal to be transmitted and said selected quasi-random code and quasi-random code selection signal associated information associated with said quasi-random code selection signal which is not scrambled, said de-scrambling means comprising:

second quasi-random code generating means for outputting a plurality of quasi-random codes in accordance with said predetermined generator polynomial;

quasi-random code selection signal extracting means for extracting said quasi-random code selection signal associated information in said scrambled digital signal to output said quasi-random code selection signal on the basis of said quasi-ransom code selection signal associated information;

second quasi-random code selecting means receiving said quasi-random code selection signal for outputting one of said plurality of quasi-random codes which is indicated by said quasi-random code selection signal as said selected quasi-random code; and de-scrambling arithmetic means for performing de-scrambling arithmetic on said scrambled digital information in said scrambled digital signal and said selected quasi-random code to generate said de-scrambled digital signal.

15. The digital signal processing system of claim 14, wherein said quasi-random code selection signal generating means includes random number generating means based on the clock count of a predetermined clock signal.

16. The digital signal processing system of claim 15, wherein said scrambling means further comprising:

quasi-random code selection signal associated information output means for outputting said quasi-random code selection signal associated information to the outside.

17. The digital signal processing system of claim 16, wherein said scrambling arithmetic means includes an exclusive-OR gate having a first input receiving the part of the digital signal to be transmitted and a second input receiving said selected quasi-random code.

18. The digital signal processing system of claim 17, wherein said de-scrambling arithmetic means includes an exclusive-OR gate having a first input receiving said scrambled digital information and a second input receiving said selectee quasi-random code.

19. The digital signal processing system of claim 17, wherein:

said scrambled digital signal contains a start flag positioned at the beginning and said quasi-random code selection signal associated information following said start flag;

said digital signal transmitter further includes first detecting means for outputting a first detection signal upon detecting said start flag from said scrambled digital signal, and second detecting means for outputting a second detection signal upon detecting said quasi-random code selection signal associated information from said scrambled digital signal; and said quasi-random code selection signal extracting means extracts said quasi-random code selection signal associated information in response to said first and second detection signals.

20. The digital signal processing system of claim 19, wherein said first and second quasi-random code generating means include:

first to n-th (n≧2) flip-flops, the output of said n-th flip-flop being fed back to an input of said first flip-flop; and first to (n−1)-th exclusive-OR gates having a first input receiving the output of an i-th (1≦i≦(n−1)) flip-flop, a second input receiving the output of said n-th flip-flop in common, and an output applied to an input of an (i+1)-th flip-flop, and the respective outputs of said first to n-th flip-flops are said plurality of quasi-random codes.

21. A digital signal processing system including a digital signal transmitter having scrambling means for scrambling a digital signal by said scrambling, means to transmit a scrambled digital signal, and a digital signal receiver having de-scrambling means and receiving said scrambled digital signal for descrambling said scrambled digital signal by said de-scrambling means to provide a de-scrambled digital signal, said scrambling means comprising:

generator polynomial information generating means for generating generator polynomial information specifying a generator polynomial;

first quasi-random code generating means receiving said generator polynomial information for outputting a plurality of quasi-random codes in accordance with said specified generator polynomial determined based on said generator polynomial information;

quasi-random code selection signal generating means for generating a quasi-random code selection signal indicative of a quasi-random code to be selected from said plurality of quasi-random codes;

first quasi-random code selecting means receiving said quasi-random code selection signal for outputting the quasi-random code indicated by said quasi-random code selection signal as a selected quasi-random code; and scrambling arithmetic means for generating said scrambled digital signal for each packet containing scrambled digital information provided by performing scrambling arithmetic on a part of a digital signal to be transmitted and said selected quasi-random code, generator polynomial associated information associated with said generator polynomial information which is not scrambled, and quasi-random code selection signal associated information associated with said quasi-random code selection signal which is not scrambled, said de-scrambling means comprising:

generator polynomial information extracting means for outputting said generator polynomial information on the basis of said generator polynomial associated information in said scrambled digital signal;

second quasi-random code generating means receiving said generator polynomial information for outputting a plurality of quasi-random codes in accordance with a generator polynomial determined based on said generator polynomial information;

quasi-random code selection signal extracting means for outputting said quasi-random code selection signal on the basis of said quasi-random code selection signal associated information in said scrambled digital signal;

second quasi-random code selecting means receiving said quasi-random code selection signal for outputting one of said plurality of quasi-random codes which is indicated by said quasi-random code selection signal as said selected quasi-random code; and de-scrambling arithmetic means for performing de-scrambling arithmetic on said scrambled digital information in said scrambled digital signal and said selected quasi-random code to generate said de-scrambled digital signal.

22. The digital signal processing system of claim 21, wherein said first and second quasi-random code generating means include:

first to n-th (n≧2) flip-flops, the output of said n-th flip-flop being fed back to an input of said first flip-flop;

first to (n−1)-th exclusive-OR gates having a first input receiving the output of an i-th (1≦i≦(n−1)) flip-flop and an output applied to an input of an (i+1)-th flip-flop; and logic control means for outputting first to (n−1)-th logic control signals to a second input of said first to (n−1)-th exclusive-OR gates, respectively, on the basis of said generator polynomial information, and the respective outputs of said first to n-th flip-flops are said plurality of quasi-random codes.

* * * * *